US008245090B2

(12) United States Patent
Takahashi et al.

(10) Patent No.: US 8,245,090 B2
(45) Date of Patent: Aug. 14, 2012

(54) APPARATUS FOR FORMATTING INFORMATION STORAGE MEDIUM

(75) Inventors: Yoshihisa Takahashi, Osaka (JP); Motoshi Ito, Osaka (JP); Yoshikazu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 28 days.

(21) Appl. No.: 12/879,048

(22) Filed: Sep. 10, 2010

(65) Prior Publication Data

US 2010/0332926 A1 Dec. 30, 2010

Related U.S. Application Data

(62) Division of application No. 11/779,379, filed on Jul. 18, 2007, now Pat. No. 7,818,637.

(30) Foreign Application Priority Data

Jul. 19, 2006 (JP) .................................. 2006-196356

(51) Int. Cl.
*G11C 29/00* (2006.01)
*G11C 7/00* (2006.01)

(52) U.S. Cl. ......... 714/723; 714/710; 365/200; 365/201
(58) Field of Classification Search .................. 714/723, 714/710, 711, 718–719, 763, 799, 819, 824, 714/6–8, 42, 47–48, 54; 365/200, 201; 711/200, 711/202, 203, 207
See application file for complete search history.

(56) References Cited

U.S. PATENT DOCUMENTS 4,807,205 A * 2/1989 Picard .......................... 369/30.09
6,149,316 A 11/2000 Harari et al.
(Continued)

FOREIGN PATENT DOCUMENTS

JP 2000-222831 8/2000
(Continued)

OTHER PUBLICATIONS

"Information Technology"; Multi-Media Commands-5 (MMC-5) Apr. 2006; Internet URL: http://www.t10.org/ftp/t10/drafts/mmc5/mmc5r03.pdf. (Cited in [0026], p. 10 of the specification).

(Continued)

*Primary Examiner* — Christine Tu
(74) *Attorney, Agent, or Firm* — Renner, Otto, Boisselle & Sklar, LLP

(57) ABSTRACT

An apparatus according to the present invention is designed to perform formatting processing on an information storage medium. The storage medium has a data storage area including a user data area and a spare area. The user data area is provided to write user data on, while the spare area includes a replacement block to be used as a replacement for a block that has been detected as a defective block. The replacement block stores instruction information that instructs to read data from the defective block when data is read from the replacement block. The apparatus includes a control section for controlling the formatting processing. In performing the formatting processing, the control section updates information stored in the replacement block such that when data is read from the replacement block, the data is not read from the defective block.

6 Claims, 17 Drawing Sheets

U.S. PATENT DOCUMENTS

| | | |
|---|---|---|
| 7,672,204 B2 * | 3/2010 | Park et al. .................. 369/47.14 |
| 2004/0158768 A1 | 8/2004 | Park et al. |
| 2004/0202076 A1 | 10/2004 | Motohashi |
| 2005/0265191 A1 | 12/2005 | Hwang et al. |
| 2006/0077816 A1 | 4/2006 | Park |
| 2006/0230325 A1 | 10/2006 | Motoshi |

FOREIGN PATENT DOCUMENTS

| | | |
|---|---|---|
| JP | 2004-253109 | 9/2004 |
| JP | 2005-339773 | 12/2005 |

OTHER PUBLICATIONS

Co-pending U.S. Appl. No. 11/779,379, filed Jul. 18, 2007 (allowed claims provided).

JPO "Notice of Reasons for Rejection" (with English translation), dated Dec. 6, 2011, corresponding to Japanese Patent Application No. 2007-184726, which claims priority to Japanese Patent Application No. 2006-196356.

* cited by examiner

FIG.4A

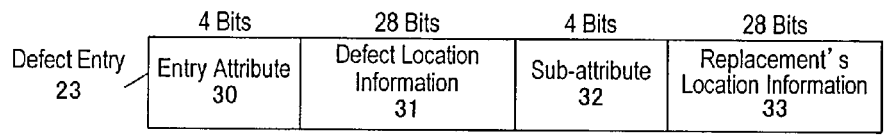

| Defect Entry 23 | Entry Attribute 30 (4 Bits) | Defect Location Information 31 (28 Bits) | Sub-attribute 32 (4 Bits) | Replacement's Location Information 33 (28 Bits) |

FIG.4B

| Entry Attribute 30 | | Defect Location Information 31 | Sub-attribute 32 | Replacement's Location Information 33 | Certification Target |
|---|---|---|---|---|---|
| RAD (with Replacement Block Assigned) | RAD0 (Replacement Block Written) | Defective Block's PSN | — | Replacement Block's PSN | O |
| | | Defective Block's PSN | Discard (Needs Complementing) | Replacement Block's PSN | O |
| | RAD1 (Replacement Block not Written Yet) | Defective Block's PSN | — | Replacement Block's PSN | O |
| NRD (with No Replacement Block Assigned) | — | Defective Block's PSN | — | — | O |
| SPR (Replacement Block Available) | — | — | — | Replacement Block's PSN | × |
| | — | — | RDE (Replacement Block could be Defective) | Replacement Block's PSN | O |
| PBA (One or More Continuous Blocks that could be Defective) | — | Defective Block's PSN | — | Number of Continuous Blocks | O |
| | — | Defective Block's PSN | RDE (Replacement Block could be Defective) | Number of Continuous Blocks | O |
| UNUSE (Replacement Block is Defective) | — | — | — | Defective Block's PSN | O |

FIG.5
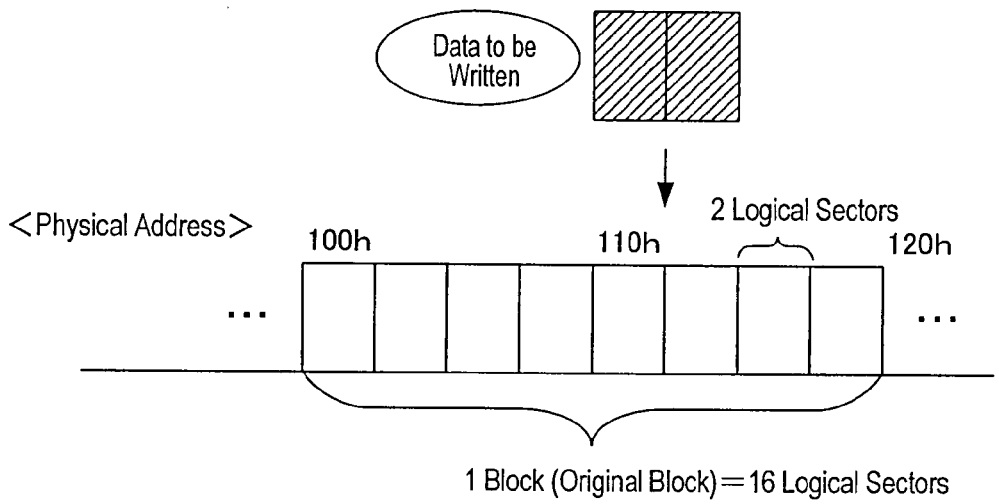
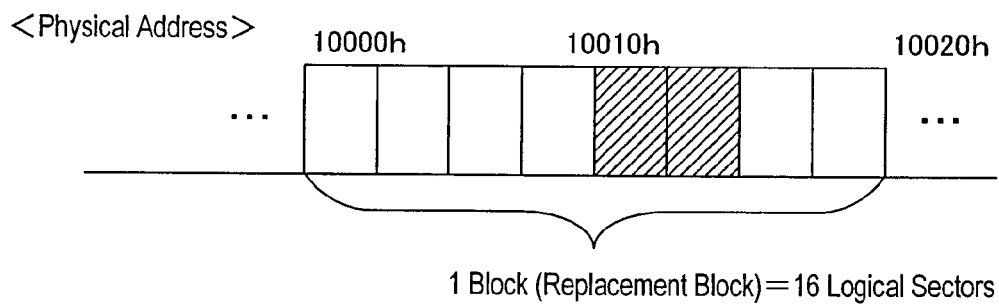

| Status Bits (Sa Information) | |
|---|---|
| 00 | Normal User Data is Being Written |
| 01 | Stream (AV) Data is Being Written |
| 10 | Read Error Occurred During Read-Modify-Write (=Data in Discard State) |
| 11 | Padding Data is Being Written |

Block in Discard State (PSN: A)

| Status Bits | 00 | 00 | 00 | 00 | 10 | 10 | 10 | 10 |
|---|---|---|---|---|---|---|---|---|
| Data | ///| /// | /// | /// |   |   |   |   |

Block Identified by PLA (PSN: D)

| Status Bits | 00 | 00 | 00 | 00 | 00 | 00 | 00 | 00 |
|---|---|---|---|---|---|---|---|---|
| Data | ▓ | ▓ | ▓ | ▓ | ▓ | ▓ | ▓ | ▓ |

Complemented Data

| Status Bits | 00 | 00 | 00 | 00 | 00 | 00 | 00 | 00 |
|---|---|---|---|---|---|---|---|---|
| Data | /// | /// | /// | /// | ▓ | ▓ | ▓ | ▓ |

FIG.14

Defect List 21 (Latest Defect List Information 40)

| Defect List Header 22 | | | |
|---|---|---|---|
| RAD0 | 120100h | — | 100000h |
| RAD0 | 120120h | — | 100020h |
| RAD0 | 120200h | — | 100040h |
| NRD | 120080h | — | — |
| NRD | 120420h | — | — |
| SPR | — | — | 1000C0h |
| SPR | — | RDE | 100060h |
| PBA | 120180h | — | 1 |
| PBA | 120300h | — | 2 |
| UNUSE | — | — | 100080h |
| UNUSE | — | — | 1000A0h |
| UNUSE | — | — | 100100h |

← Defect Entry 23

Generate Certification Target List

Certification Target List Information 41

| | |
|---|---|
| 100060h | ← Corresponding to SPR (RDE) |
| 100080h | ← Corresponding to UNUSE |
| 1000A0h | ← Corresponding to UNUSE |
| 100100h | ← Corresponding to UNUSE |
| 120080h | ← Corresponding to NRD |
| 120100h | ← Corresponding to RAD0 |
| 120120h | ← Corresponding to RAD0 |
| 120180h | ← Corresponding to PBA |
| 120200h | ← Corresponding to RAD0 |
| 120300h | ← Corresponding to PBA |
| 120320h | |
| 120420h | ← Corresponding to NRD |
| FFFFFFFFh | |

FIG. 17

Defect List 21 (Latest Defect List Information 40)

| \multicolumn{4}{l}{Defect List Header 22} | |
| --- | --- | --- | --- |
| \multicolumn{4}{l}{· Overall Number of Entries: S+11} | |
| \multicolumn{4}{l}{· Total Number of Entries with RAD Attribute: 3} | |
| \multicolumn{4}{l}{· Total Number of Entries with NRD Attribute: 2} | |
| \multicolumn{4}{l}{· Total Number of Entries with SPR Attribute: S+1} | |
| \multicolumn{4}{l}{· Total Number of Entries with PBA Attribute: 2} | |
| \multicolumn{4}{l}{· Total Number of Entries with UNUSE Attribute: 3} | |
| RAD0 | 120100h | — | 100000h |
| RAD0 | 120120h | ... | 100020h |
| RAD0 | 120200h | — | 100040h |
| NRD | 120080h | — | — |
| NRD | 120420h | — | — |
| SPR | — | — | 1000C0h |
| SPR | ... | ... | ... |
| SPR | — | — | 101000h |
| SPR | — | RDE | 100060h |
| PBA | 120180h | — | 1 |
| PBA | 120300h | — | 2 |
| UNUSE | — | — | 100080h |
| UNUSE | — | — | 1000A0h |
| UNUSE | — | — | 100100h |

Attribute-by-attribute Entry Top Location Pointer 44

← 0 (RAD)

← 3 (NRD)

※Total Number = S

← S+5 (SPR)

← S+6 (PBA)

← S+8 (UNUSE)

APPARATUS FOR FORMATTING INFORMATION STORAGE MEDIUM

This application is a divisional of U.S. patent application Ser. No. 11/779,379 filed on Jul. 18, 2007, now U.S. Pat. No. 7,818,637 issued on Oct. 19, 2010, which claims priority to Japanese Application No. 2006-196356 filed on Jul. 19, 2006, and is hereby incorporated herein by reference in its entirety.

BACKGROUND OF THE INVENTION

1. Field of the Invention

The present invention relates to an apparatus for formatting an information storage medium and more particularly relates to an apparatus for setting a certification format.

2. Description of the Related Art

Recently, various removable information storage media with big storage capacities and drives for performing read and write operations on such media have become immensely popular.

Examples of known removable information storage media with big storage capacities include optical disk media such as DVDs (Digital Versatile Discs) and BDs (Blu-ray Discs). An optical disk drive writes data on an optical disk medium using a laser beam. Specifically, a red laser beam is used for DVDs, while a blue laser beam, having a shorter wavelength than the red laser beam, is used for BDs, thereby making the storage density and storage capacity of BDs higher and greater than those of DVDs.

FIG. 1 illustrates an exemplary layout of areas on an optical disk medium. The disklike optical disk medium 1 has a spiral track 2, along which a great many blocks 3 are arranged.

As far as BDs are concerned, the track 2 should have a width (which is also called a "track pitch") of 0.32 μm according to the standard. Blocks 3 are not only units of error correction but also the smallest units of read/write operations. Each block 3 is supposed to be one ECC (with a size of 32 KB) on DVDs and one cluster (with a size of 64 KB) on BDs. If these units are represented on the basis of a sector, which is the smallest data unit for optical disk media and has a size of 2 KB, one ECC is equal to 16 sectors and one cluster is equal to 32 sectors.

For BDs, a logical sector called "AUN" (where one logical sector is equal to two sectors and has a size of 4 KB) is sometimes used.

On BDs, data in each block 3 is classifiable into user data to be stored in a data block and addresses and other flag information to be stored in a flag block. FIG. 2 shows the data format of a block 3 on a BD.

As shown in FIG. 2, a parity, which is an error correction code, is added to each of the user data in the data block and the flag information in the flag block, thereby forming an LDC cluster and a BIS cluster, respectively. Then, the data in these two clusters are interleaved together to form an ECC cluster. In each block (or cluster) 3 of a BD, stored is data in this data format called "ECC cluster". The data in the BIS cluster is smaller in size the data in the LDC cluster. However, the parity data added to the BIS cluster is comparable to that added to the LDC cluster. That is why the data in the BIS cluster realizes extremely high error correction ability and is much more likely to be read correctly than the data block corresponding to the LDC cluster.

In the following description, "cluster" will refer to such a block 3 on BDs. It should be noted, however, that the cluster does not have to be equivalent to the block.

FIG. 3 shows the structure of a recordable optical disk medium.

The optical disk medium 1 includes a lead-in area 4, a data area 5 and a lead-out area 6.

The data area 5 includes a user data area 14 and two spare areas 15a and 15b.

The user data area 14 is an area on which the user can write any type of information he or she likes, including real time data such as music and video and computer data such as documents and databases.

The spare areas 15a and 15b are alternative areas to store data in place of some block 3 in the user data area 14. For example, if a defective block has been detected in the user data area 14, one of these spare areas 15a and 15b is used as an alternative area to replace that block. In the example shown in FIG. 3, the spare areas 15a and 15b are arranged inside and outside of the data area 5 so as to be adjacent to the lead-in area 4 and the lead-out area 6, respectively.

The lead-in area 4 is located inside of the data area 5, while the lead-out area 6 is located outside of the data area 5. These areas 4 and 5 not only store management information about the optical disk medium 1 but also prevent the optical pickup (not shown) from making an overrun.

The lead-in area 4 includes first and second defect management areas 10 and 11 (which will be referred to herein as "$1^{st}$ DMA" and "$2^{nd}$ DMA", respectively). Each of the $1^{st}$ and $2^{nd}$ DMAs stores disk management information such as information about the data structure and defects of the optical disk medium 1.

The lead-out area 6 includes third and fourth defect management areas 12 and 13 (which will be referred to herein as "$3^{rd}$ DMA" and "$4^{th}$ DMA", respectively). Each of the $3^{rd}$ and $4^{th}$ DMAs stores disk management information such as information about the data structure and defects of the optical disk medium 1.

It should be noted that the DMA normally stands for a defect management area. However, as the DMA may store not only defect management information but also various other types of information about a disk (which is called "disk management information"), the DMA may sometimes stand for a disk management area in a broader sense.

The $1^{st}$ through $4^{th}$ DMAs are arranged in their own areas on the optical disk medium 1 and store quite the same information, which is done to prepare for a situation where any of the $1^{st}$ through $4^{th}$ DMAs has gone defective. That is to say, even if information can no longer be retrieved from one of these four DMAs properly, the defect management information can still be acquired as long as there is at least one DMA from which information can be retrieved properly.

Each of the $1^{st}$ through $4^{th}$ DMAs has a disk definition structure (which will be abbreviated herein as "DDS") 20 and a defect list (which will be abbreviated herein as "DFL") 21.

The DFL 21 includes defect entries 23 that store information about alternation processing such as the locations of the defective block and its replacement block and a defect list header 22 including the identifier of the DFL 21, information about the number of times of update, and information about the total number of defect entries 23.

Next, an address showing the location of the block 3 will be described. The "address" may be a physical address (or physical sector number, which will be abbreviated herein as "PSN"), which is a piece of information about the physical location of the block 3 on the storage layer of the optical disk medium 1, or a logical address (or logical sector number, which will be abbreviated herein as "LSN") to be virtually assigned consecutively to the data area 5 that can be accessed by a host device (i.e., a logical space). These addresses are usually assigned on a sector-by-sector basis. Or a predetermined number of addresses may be assigned to each block 3.

A PSN on a BD-RE, which is a rewritable BD, may be either an address called "ADIP" represented by the wobbled side surface of the track 2 or an address called "AUN" to be assigned to the data stored in the block 3. On the other hand, LSNs are a series of address information that is virtually assigned consecutively to the data area 5 and that starts with zero. The LSNs are usually addresses that are supposed to be assigned sequentially to all blocks 3 and that start with zero assigned to the first block in the user data area 14. If any of the blocks 3 in the user data area 14 has been subjected to the alternation processing, however, the LSN that would have been assigned to the original block will be assigned to the replacement block in one of the spare areas 15a and 15b.

The physical sector numbers (PSNs) are addresses that are assigned in the ascending order along the track path on the disk. In a BD-RE with two storage layers (which will be referred to herein as L0 and L1 layers, respectively), an addressing method called "opposite path" is adopted. That is why physical addresses are assigned to the L0 layer in the ascending order from the inner area of the disk toward the outer area thereof. On the other hand, physical addresses are assigned to the L1 layer in the ascending order from the outer area of the disk toward the inner area thereof.

Next, the certification processing will be described. Rewritable optical disk media such as DVD-RAMs and BD-REs are normally subjected to so-called "certification" processing to determine in advance whether the given block 3 in the data area 5 is a normal block or a defective block. Specifically, the certification processing is a testing method in which arbitrary data is written on a block 3 and that data is read from the block 3 for verification purposes to determine whether the written data is identical with the read data. If the answer is YES, that block 3 is certified as a normal block. On the other hand, if writing or verification has failed or if it has been determined that the written data disagrees with the read data, then that block 3 is detected as a defective block that cannot be used normally and information about the location of that defective block is added to the defect list 21 (see Patent Document No. 1, for example). Also, if the disk has the spare areas 15a and 15b for alternation purposes, a block 3 in the spare area 15a or 15b may be assigned to the block that has turned out to be defective as a result of the certification processing (see Patent Document No. 2, for example).

There are several different types of certification processing. In one type of certification processing, the entire storage area on the disk is subjected to certification. In another type of certification processing, only a particular area on the disk is subjected to certification. As for a BD-RE, for example, two modes called "full certification" (which will also be referred to herein as "full certify") and "quick certification" (which will also be referred to herein as "quick certify") are defined as parts of formatting processing to be carried out to initialize the disk management information such as the DDS 20 or the DFL 21 (see Non-Patent Document No. 1). These types of processing are included in so-called "formatting processing" to be carried out to initialize the data area 5, i.e., to get the data area 5 ready to write user data on. In the area that has been subjected to any of these processes, there is no valid user data.

Specifically, the "full certify" is a mode in which all blocks 3 included in the data area 5 are subjected to certification.

On the other hand, the "quick certify" is a mode in which only the defective blocks on the defect list 21 are subjected to certification in the data area 5. This mode of processing is carried out to get minimum required blocks 3 tested more quickly than the "full certify" processing.

Next, the defect entries 23 of a BD-RE will be described.

FIG. 4 shows the makeup and types of the defect entries 23 of a BD-RE.

FIG. 4A and FIG. 4B show the makeup of the defect entries 23. Each defect entry is eight bytes (=64 bits) of information including an entry attribute 30 representing the category of the defective block, defect location information 31 such as the top physical address of the defective block that should be replaced, sub-information 32 that is additional information for the entry attribute 30 and replacement's location information 33 such as the top physical address of the replacement block to replace the defective block.

FIG. 4B shows the types of the defect entries 23 of a BD-RE, i.e., the types of the entry attributes 30. There are five entry attributes 30 including RAD, NRD, SPR, PBA and UNUSE.

Specifically, the RAD attribute represents the attribute of a defect in a single block, its defect location information 31 includes the top physical address of the defective block, and its replacement's location information 33 includes the top physical address of the replacement block in the spare area 15. RAD includes RAD0 indicating that the replacement block has actually been written as a replacement for the defective block and RAD1 indicating that the replacement block has been assigned to the defective block but actually has been written as a replacement yet (i.e., the block identified by the replacement's location information 33 has not been used yet). The RAD0 attribute may be expressed as "0000" and the RAD1 attribute may be expressed as "1000" according to the binary notation.

The RAD0 and RAD1 attributes are different in that when a data read request has been submitted, data is read from either the replacement block (according to RAD0 attribute) or the original (i.e., defective) block (according to RAD1 attribute). If a data write request has been submitted, then the replacement block is accessed no matter whether the attribute is RAD0 or RAD1.

It should be noted that a piece of information representing a "discard" state may be set as a binary number "1000", for example, for the sub-attribute 32 of RAD0. The "discard" state indicates that a portion of the data that should have been written in the original block is actually written in the replacement block as will be described in further detail later.

The NRD attribute represents a single defective block that has not been replaced yet, and the defect location information 31 includes only the top physical address of the defective block. The NRD attribute may be represented as a binary number "0001", for example.

The SPR attribute designates a block that can be used as a replacement block in the spare area 15, and its replacement's location information 33 includes the top physical address of the replacement block. The SPR attribute may be represented as a binary number "0010", for example.

It should be noted that a piece of information representing a "RDE" state may be set as a binary number "0100", for example, for the sub-attribute 32 of the SPR attribute. The "RDE" state indicates that the replacement block identified by the replacement's location information 33 has once been detected as defective and could still be defective.

The PBA attribute represents an area including at least one block that could be defective. Its defect location information 31 includes the top physical address of that area and its replacement's location information 33 includes the number of continuous blocks. The PBA attribute may be represented as a binary number "0100", for example.

It should be noted that a piece of information representing a "RDE" state may be set as a binary number "0100", for example, for the sub-attribute 32 of the PBA attribute. The "RDE" state indicates that the area identified by the defect location information 31 and the replacement's location information 33 has once been detected as defective and could still be defective.

The UNUSE attribute designates a single defective block in the spare area 15a or 15b, and its replacement's location information 33 includes the top physical address of the defective block. The UNUSE attribute may be represented as a binary number "0111", for example.

In the defect list 21 (see FIG. 3), stored are the defect entries 23 that have been sorted in the ascending order by the eight-byte values thereof. Speaking more exactly, the defect entries 23 are stored in the defect list 21 after having been sorted in the ascending order by their 63-bit values except their most significant bits. RAD0 and RAD1 are treated as the same attribute. That is to say, the defect entries 23 have been grouped according to their entry attributes and then sorted in the ascending order.

Hereinafter, the "discard" state mentioned above will be described in further detail. Data is basically read and written from/on a rewritable optical disk medium 1 on a block-by-by basis. As for a BD-RE, for example, reading and writing is performed on a cluster (=64 KB) basis. However, the host PC may request to write data, of which the size is even short of the block unit. In order to satisfy such a request, the drive for reading and writing data from/on the optical disk medium 1 has a so-called "read-modify-write" function (which will be abbreviated herein as an "RMW function").

FIG. 5 shows the procedure of RMW processing, in which a BD-RE is supposed to be used as a storage medium. It should be noted that by adding h to the end of a numeral, a hexadecimal number is expressed.

Hereinafter, it will be described with reference to FIG. 5 what processing should be carried out in response to a request of writing data, which has a top physical address 110h and of which the size is 8 h (corresponding to four logical sectors), on a cluster, which has a top physical address 100h and of which the size is 16 logical sectors (corresponding to 20h when represented as a difference in address). That is to say, the size of the data to be written is smaller than that of the cluster unit.

In Step (1), data is read out from a block (i.e., a cluster) including the physical address 110h at which the data should start to be written. In this example, the read operation is supposed to have failed and this block is treated as a defective block.

In Step (2), a portion of the data that has been read in Step (1) is replaced with the requested data at the location specified, thereby newly generating one block of data.

In Step (3), a block in the spare area 15 (with a top physical address 10000h, for example) is assigned as a replacement block to the defective block, from which data has been read in Step (1), and the one block of data, which has been generated in Step (2), is written in that replacement block.

Although the user has requested only the write processing step, the RMW processing includes a data read operation (which will be referred to herein as a "read processing step") and a data write operation (which will be referred to herein as a "write processing step"). Before the write processing step is carried out, the read processing step may fail for some reason (e.g., due to deposition of dust on the surface of the disk) and data may be unable to be read from that block properly. However, since the user has requested writing, it is not preferable to regard it as a write error because reading has failed.

As for a BD, it was proposed that flag information called "flag bits", indicating the status of the block or sector, be included in the BIS data and that two-bit information called "status bits (Sa)", indicating the status of data on a sector-by-sector basis, be included in that flag information (see Patent Document No. 3, for example). The status bits of the sector, at which reading has failed during the RMW processing, are changed into a value indicating the failure (e.g., a binary number "10"). According to Patent Document No. 3, the status bits are actually supposed to be "01". However, the bits are supposed herein to be "10" for convenience sake.

The data of a sector, of which the status bits are currently "10", will be referred to herein as "data in discard state". Likewise, a block including such data in the discard state will be referred to herein as "block in discard state". In other words, the "block in discard state" means a block, of which the block data needs to be (or can be) complemented with data of another block at least partially.

However, even if such status bits are added to the sector, data still remains stored in the replacement block with the data that has not been read successfully still missing.

Meanwhile, it is true that the original block, at which the read operation failed during the RMW processing, was soiled with dust, finger marks or anything like that. However, the user may already have wiped the soil or dust off and the data in question may be readable properly when reading is tried next time. For that reason, it was proposed that another piece of information called "previous location address" (which will be abbreviated herein as "PLA") be included in the flag bits on a BD (see Patent Document No. 3, for example).

This PLA is information that is valid only within the replacement block, and is physical address information showing at what physical address location the data in the replacement block with this PLA has been stored previously. In a BD-RE, PLA with a valid value is set only in the replacement block in the spare area 15a or 15b and zero representing null state is always set in any other block in the remaining area (i.e., the user data block 14).

When Data A is read from the replacement block in the discard state, Data B identified by PLA is also read from the defective block. And if Data B has been read successfully, Data A is complemented with that Data B. In this manner, the original data can be restored properly. That is why PLA is significant valid information for the replacement block in the discard state.

Hereinafter, the RMW processing will be described in further detail with reference to FIG. 6A and FIG. 6A, in which FIG. 6A shows the types of status bits and FIG. 6B shows the RMW processing.

As shown in FIG. 6B, if read operation has failed during the PMW processing, then the PMW processing is carried out by performing:

Step (1) of generating dummy data in which the status bits of all sectors within a block are set to be "10" according to the binary notation;

Step (2) of modifying the data that has been generated in Step (1) with the data to be written and changing the status bits of the modified sectors into "00" according to the binary notation; and Step (3) of writing the data that has been generated in Step (2) in the replacement block.

Hereinafter, the correlation between the PLA and the defect entries 23 will be described with reference to FIG. 7A and FIG. 7B. In FIG. 7A and FIG. 7B, the physical addresses that should be assigned to sectors are supposed to be assigned to blocks 3 for the sake of simplicity.

FIG. 7A shows the status of the disk yet to be subjected to the RMW processing. As shown in FIG. 7A, if a request to write data, of which the size is smaller than one block unit, on a block with physical address D has been submitted, the RMW processing needs to be carried out. However, this block with the physical address D is supposed to be defective and data cannot be read from the block properly.

FIG. 7B shows the status of the disk that has been subjected to the RMW processing. Since data cannot be read from the block with the physical address D properly, the status bits thereof are changed into "10" according to the binary notation, and the data to be written is modified and written on a replacement block with physical address A in the spare area 15.

In this case, the PLA value of the block with the physical address A is defined so as to refer to the physical address D. Also, since an alternative write operation has been performed due to the presence of a defect, a defect entry 23 with entry attribute RAD0, of which the defect location information 31 is physical address D, the replacement's location information 33 is physical address A and the sub-attribute 32 is discard state (represented by a binary number "1000"), is added to the defect list 21 (see FIG. 3).

FIG. 8A and FIG. 8B show how to perform complementing processing on data in the discard state. Specifically, FIG. 8A shows a replacement block with physical address A and in the discard state, of which the PLA value is defined so as to indicate physical address D. FIG. 8B shows the procedure of the complementing processing. As shown in FIG. 8B, if all data has been read properly from the original block with physical address D, then the data that has been read from the replacement block is complemented with the data of the original block, thereby restoring the original data correctly.

Meanwhile, if data cannot be read properly from the block identified by the PLA in response to a read request, then the read request will result in an error.

FIG. 9 is a flowchart showing the procedure of so-called "PLA tracing" processing to complement data. Hereinafter, the respective processing steps will be described as being applied to the example shown in FIG. 8.

The first step 801 is moving to the replacement block to read data from. In this example, the optical head is moved to the location with physical address A shown in FIG. 8.

The next step 802 is reading data from the target replacement block.

The third step 803 is determining whether the read data is in the discard state or not (whether the PLA is effective or not). More specifically, it is determined whether or not the read data includes status bits "10".

If the answer is YES, then the next step 804 is moving to the original block identified by the PLA. For example, the optical head is moved to the location with the physical address D shown in FIG. 8.

The next step 805 is reading data from the target original block and complementing the data that has been read from the replacement block with the former data.

If the data that has been generated in Step 805 is still in the discard state, the series of processing steps 803 through 805 are repeatedly performed a number of times. Optionally, this repetition processing step may be omitted.

The final processing step 806 is determining the data to be definitive one if the data has turned out to be no longer in the discard state.

Next, blocks to be certified will be described. In a BD-RE, blocks, which are checked with ○ in its target of certification column of the entry attribute in FIG. 4B, are designated as a target of certification. Only the block with the SPR attribute, of which the sub-attribute 32 does not include the "RDE" information, is not the target of certification. More specifically, the blocks to be certified are listed as defect entries 23 in the following five entry attributes 30:

A block designated by the defect location information 31 of a defect entry 23, of which the entry attribute 30 is RAD;

A block designated by the defect location information 31 of a defect entry 23, of which the entry attribute 30 is NRD;

A block designated by the replacement's location information 33 of a defect entry 23, of which the entry attribute 30 is SPR (and of which the sub-attribute 32 must include "RDE" information);

An area that starts with a block designated by the defect location information 31 of a defect entry 23, of which the entry attribute 30 is PBA, and that includes a number of continuous blocks designated by the replacement's location information 33; and A block designated by the replacement's location information 33 of a defect entry 23, of which the entry attribute 30 is UNUSE.

In the quick-certify processing, the defect list 21 is subjected to the following processing based on the results of the certification:

(1) Block that Couldn't be Certified Successfully

If a block, of which the entry attribute 30 is SPR (i.e., of which the sub-attribute 32 includes "RDE"), could not be certified successfully, then the defect entries are changed into a defect entry 23 with the UNUSE attribute, of which the replacement's location information 33 designates that block.

If a block, of which the entry attribute 30 is PBA, could not be certified successfully, then a defect entry 23 with the RAD or NRD attribute, of which the defect location information 31 designates that block, is added and the defect entry 23 with the PBA attribute is deleted.

(2) Block that could be Certified Successfully

If a block, of which the entry attribute 30 is RAD or NRD, could be certified successfully, then a defect entry 23, of which the defect location information 31 designates that block, is deleted.

If a block, of which the entry attribute 30 is PBA, could be certified successfully, then a defect entry 23, of which the defect location information 31 designates that block, is deleted.

If a block, of which the entry attribute 30 is SPR (and of which the sub-information 32 includes RDE information), could be certified successfully, then defect entries are changed into a defect entry 23 with the SPR attribute, of which the sub-information 32 does not include the RDE information.

If a block, of which the entry attribute 30 is UNUSE, could be certified successfully, then defect entries are changed into a defect entry 23 with the SPR attribute, of which the sub-information 32 does not include the RDE information.

Patent Document No. 1: Japanese Patent Application Laid-Open Publication No. 2000-222831

Patent Document No. 2: Japanese Patent Application Laid-Open Publication No. 2004-253109

Patent Document No. 3: U.S. Patent Application Publication Ser. No. 2006/0077816

Non-Patent Document No. 1: Information Technology—Multi-Medium Command-5 (MMC-5), [online], [searched the Internet on Jun. 28, 2006], the Worldwide Web URL: http://www.t10.org/ftp/t10/drafts/mmc5/mmc5r03.pdf.

In the quick-certify processing, only the defective block on the defect list 21 (see FIG. 3) is subjected to the certification processing. And depending on the results of the certification processing, the defect entries 23 are deleted, changed or added as described above. However, if a block with the RAD or NRD attribute could not be certified successfully, for example, there would be some problems. For instance, if such a block could not be certified successfully, the defect entry 23 with the RAD attribute could be left as it is or the attributes could be changed into RAD by assigning a replacement block to the block that has turned out to be defective.

There are two types of RAD attributes, namely, RAD0 and RAD1 attributes. The difference between these two attributes is whether the data of the replacement block is valid or not, i.e., whether the data should be read from the replacement block or the original block. Supposing a block that has caused an error as a result of the certification processing is listed as a block with the RAD1 attribute, if an RMW request on that block were submitted, then read processing should be performed on a defective block. In that case, the data would most probably be unreadable and the read processing would have to be retried, thus deteriorating the processing performance, which is a problem. A similar problem would arise even if a block that has caused an error as a result of the certification processing were listed as a defect entry 23 with the NRD attribute.

It should be noted that since the defect entry 23 with the PBA attribute is defined to be no longer existent after the quick-certify processing, no block could be listed as a defect entry 23 with the PBA attribute.

That is why a block that has caused an error as a result of the certification processing is preferably listed as a defect entry 23 with the RAD0 attribute. In a block with the RAD0 attribute, the replacement block would be accessed no matter whether the request submitted is a read request or a write request. In the quick-certify processing, certification is done on only a defective block but nothing particular is carried out on a spare area being used as an alternative area. For that reason, if there is a replacement block in the discard state, information showing the discard state will remain as it is in the replacement block even after having been subjected to the quick-certify processing. Meanwhile, in cases of full-certify processing, the entire data area 5, including the spare areas 15a and 15b, is all subjected to the certification processing, and therefore, no block in the spare area could remain in the discard state.

In a situation where that piece of information showing the discard state remains as it is in the replacement block even after the defective block has been subjected to the quick-certify processing, if a request to perform a read operation (specifically, read operation of RMW processing) on that replacement block is submitted next, then the PLA tracing processing shown in FIG. 9 needs to be carried out. Since there is no valid user data in the original block identified by the PLA as a result of the quick-certify processing, this PLA tracing processing is not only meaningless but also would deteriorate the performance.

Another problem will be described. In the defect list 21, stored are the defect entries 23 that have been sorted in the ascending order by their eight-byte values (more exactly, their 63-bit values except the most significant bits). That is to say, the physical addresses of the defective blocks are stored after those blocks have been grouped according to their entry attributes 30. But the defective blocks are not stored in the order of physical addresses.

Specifically, if there are four physical addresses A, B, C and D (where A<B<C<D), B and D are listed as defect entries 23 with the RAD0 attribute on the defect list 21, and A and C are listed as defect entries 23 with the NRD attribute on the defect list 21, then defect entries 23 with the following combinations of attributes and physical addresses:

| | |
|---|---|
| RAD0 | B, |
| RAD0 | D, |
| NRD | A, and |
| NRD | C | are stored in this order in the defect list 21.

Suppose the optical disk medium 1 has only one storage layer and defective blocks are going to be subjected to the quick-certify processing sequentially in the order that is defined in the defect list 21. In that case, first, quick-certify processing is performed on a defective block with the RAD0 attribute with the optical head moved from the inner area of the disk toward the outer area thereof. After that, the optical head goes back to the inner area of the disk to perform quick-certify processing on a defective block with the NRD attribute, and then heads back toward the outer area again. As there are five types of entry attributes 30, the optical head may sometimes have to move from the inner area toward the outer area five times. Even if the optical disk medium 1 has a number of storage layers, the optical head also has to go back and forth between multiple areas in the order of physical addresses. As a result, it would take a lot of time to get the quick-certify processing done.

SUMMARY OF THE INVENTION

An apparatus according to the present invention is designed to perform formatting processing on an information storage medium. The storage medium has a data storage area including a user data area and a spare area. The user data area is provided to write user data on, while the spare area includes a replacement block to be used as a replacement for a block that has been detected as a defective block. The replacement block stores instruction information that instructs to read data from the defective block when data is read from the replacement block. The apparatus includes a control section for controlling the formatting processing. In performing the formatting processing, the control section updates information stored in the replacement block such that when data is read from the replacement block, the data is not read from the defective block.

In one preferred embodiment of the present invention, in performing the formatting processing, the control section writes a piece of information, showing that the instruction information is null, on the replacement block.

In another preferred embodiment, in performing the formatting processing, the control section updates the instruction information into dummy information.

In still another preferred embodiment, in performing quick-certify processing as the formatting processing, the control section updates the information stored in the replacement block.

Another apparatus according to the present invention is designed to perform formatting processing on an information storage medium. The storage medium includes a plurality of blocks, to each of which a physical address is assigned. Some of the blocks have been detected as defective blocks. The storage medium also includes a defect management area to store a defect list in which the defective blocks are classified according to types of their attributes. The apparatus includes a control section for controlling the formatting processing, which includes defective block processing to be performed on the defective blocks. The control section performs the defective block processing on two or more of the defective blocks with mutually different attributes in the order of their physical addresses.

In one preferred embodiment of the present invention, the control section draws up a list in which the defective blocks that have been classified according to the types of their attributes are sorted by physical addresses and performs the defective block processing using the list.

In this particular preferred embodiment, the control section performs the defective block processing collectively on a number of defective blocks that have consecutive physical addresses.

In another preferred embodiment, in performing the defective block processing, the control section stores a piece of information, which designates the defective block to be subjected to the defective block processing next, on an attribute-by-attribute basis.

In still another preferred embodiment, in performing quick-certify processing as the defective block processing, the control section performs the certification processing on two or more of the defective blocks with mutually different attributes in the order of their physical addresses.

A method according to the present invention is designed to perform formatting processing on an information storage medium. The storage medium has a data storage area including a user data area and a spare area. The user data area is provided to write user data on, while the spare area includes a replacement block to be used as a replacement for a block that has been detected as a defective block. The replacement block stores instruction information that instructs to read data from the defective block when data is read from the replacement block. The formatting processing includes defective block processing to be performed on the defective blocks. The method includes the steps of: performing the defective block processing on the defective block; and updating information stored in the replacement block such that when data is read from the replacement block, the data is not read from the defective block.

Another method according to the present invention is designed to perform formatting processing on an information storage medium. The storage medium includes a plurality of blocks, to each of which a physical address is assigned and some of which have been detected as defective blocks. The storage medium also includes a defect management area to store a defect list in which the defective blocks are classified according to types of their attributes. The formatting processing includes defective block processing to be performed on the defective blocks. The method includes the step of performing the defective block processing on two or more of the defective blocks with mutually different attributes in the order of their physical addresses.

According to the present invention, in reading data from a replacement block, that replacement block includes instruction information that instructs to read data from a defective block, too. That is why in certifying the defective block, the information stored in the replacement block (such as PLA and/or status bits) is updated. As a result, the defective block will not be accessed when data is read from the replacement block after the defective block has been certified. Then, the unnecessary PLA tracing processing will no longer be performed in vain, thus improving the processing performance. It should be noted that the defective block includes an original block, i.e., a block in which the data that is now stored in the replacement block was stored before the data was written in the replacement block.

In addition, according to the present invention, two or more defective blocks with mutually different attributes are subjected to the defective block processing such as quick-certify processing or quick-reformat processing in the order of physical addresses. In the quick-certify processing, by performing certification processing on defective blocks to be certified in the order of physical addresses along the track path, all target blocks can get certified through a single series of processing steps along the track path. As a result, the processing performance improves. If a plurality of defective blocks should be subjected to the certification processing from one type of attribute to another, then the head would have to go back and forth between the inner and outer areas of the disk a number of times as described above. However, according to the present invention, all target blocks can get certified by going through a single series of processing steps.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4A and FIG. 4B show the details of a defect entry.

FIG. 5 shows the procedure of RMW processing on an optical disk medium.

FIG. 14 shows the certification target list information of the first preferred embodiment.

FIG. 17 shows a defect list according to the second preferred embodiment.

DETAILED DESCRIPTION OF PREFERRED EMBODIMENTS

Hereinafter, preferred embodiments of the present invention will be described with reference to the accompanying drawings.

Embodiment 1

(1) Recording/Reproduction Apparatus

Figure 10:
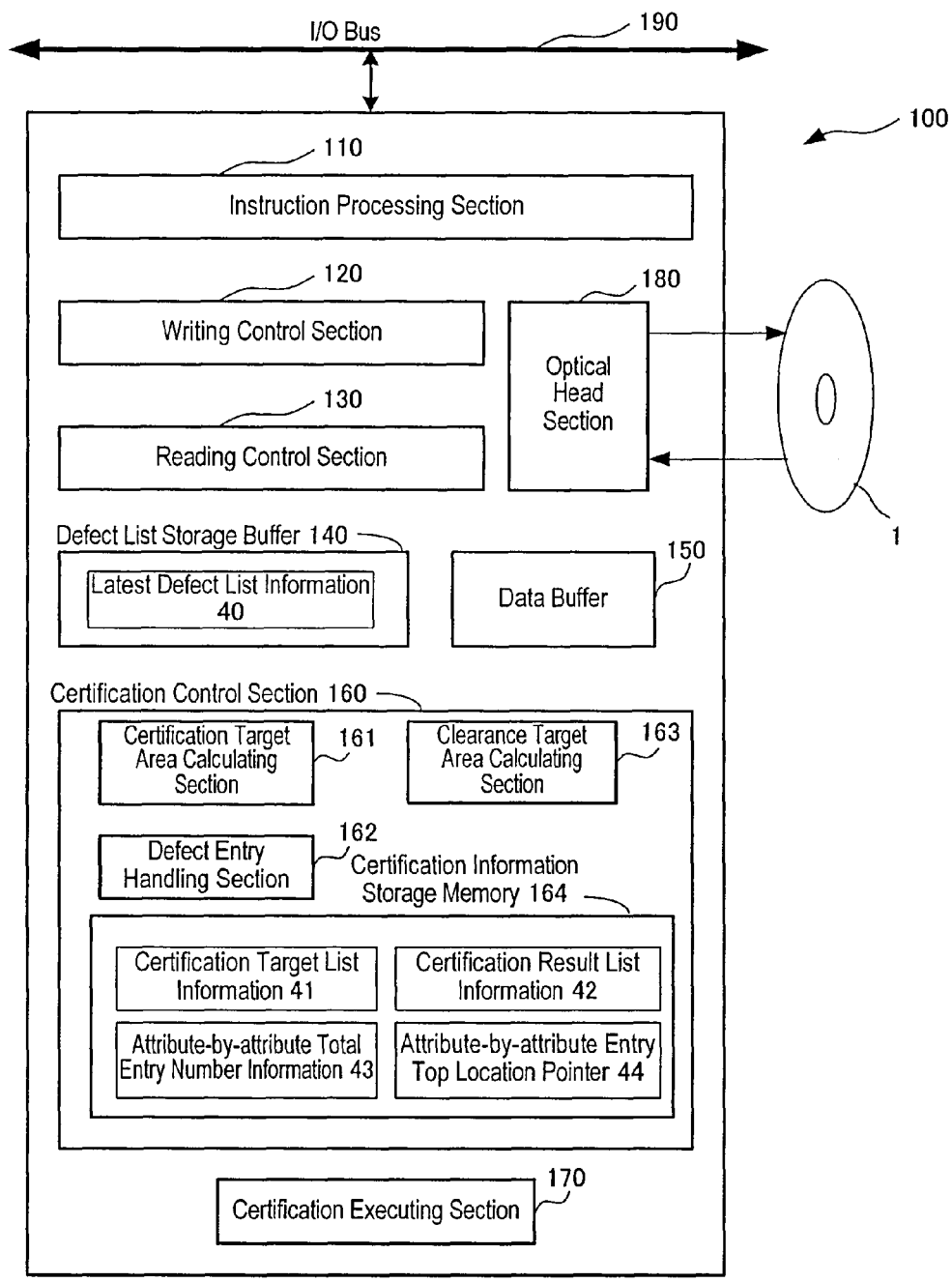
FIG. 10 shows the arrangement of functional blocks in a recording/reproduction apparatus according to a first preferred embodiment of the present invention.

First, a recording/reproduction apparatus according to a first preferred embodiment of the present invention will be described with reference to FIG. 10, which shows the arrangement of functional blocks in a recording/reproduction apparatus 100 according to the first preferred embodiment.

The recording/reproduction apparatus 100 reads and writes data from/on an optical disk medium 1. The recording/reproduction apparatus 100 is connected to a higher-order controller (not shown) through an I/O bus 190. The higher-order controller is typically a host computer.

The recording/reproduction apparatus 100 includes a command processing section 110, a writing control section 120, a reading control section 130, a defect list storage buffer 140, a data buffer 150, a certification control section 160, a certification executing section 170, and an optical head section 180.

The command processing section 110 analyzes and processes the command that has been given by the higher-order controller. The writing control section 120 controls a write operation, while the reading control section 130 controls a read operation. In accordance with the instructions given by the writing and reading control sections 120 and 130, the optical head section 180 irradiates the optical disk medium 1 with a laser beam, thereby reading and writing information from/on the optical disk medium 1. The data buffer 150 temporarily stores the data to be written and the data that has been read.

The defect list storage buffer 140 always stores the latest defect list information 40 such as a defect list 21 that has been read from one of the $1^{st}$ through $4^{th}$ DMAs or a defect list 21 that is going to be written on one of the $1^{st}$ through $4^{th}$ DMAs. The certification control section 160 controls the overall certification processing, while the certification executing section 170 executes the certification processing.

The certification control section 160 includes a certification target area calculating section 161, a defect entry handling section 162, a clearance target area calculating section 163 and a certification information storage memory 164.

The certification target area calculating section 161 figures out a target area to be subjected to the certification processing. The defect entry handling section 162 either adds a block that has caused an error as a result of the certification processing to the defect list 21 (or more strictly, to the latest defect list information 40) or removes a block that has been certified successfully from the defect list 21. The clearance target area calculating section 163 locates an area in which the data needs to be cleared (e.g., an area assigned as a replacement block), other than the certification target area, in performing quick-certify processing.

The certification information storage memory 164 stores various sorts of information that is needed to perform the certification processing. Specifically, the certification information storage memory 164 stores certification target list information 41, certification result list information 42, attribute-by-attribute total entry number information 43 and attribute-by-attribute entry top location pointer 44.

The certification target list information 41 is list information showing the target area of the certification processing. The certification result list information 42 is a piece of information about the blocks that have caused an error as a result of the certification processing. The attribute-by-attribute total entry number information 43 is a piece of information about the total number of defect entries 23 on an attribute-by-attribute basis. And the attribute-by-attribute entry top location pointer 44 is a piece of information indicating the top location of each entry attribute in the latest defect list information 40. An example of the defect list 21 (or latest defect list information 40) is shown in FIG. 11.

It should be noted that by removing the list of successfully certified blocks from the certification target list information 41, the same information as the certification result list information 42 could be generated. According to this preferred embodiment, however, the certification target list information 41 and the certification result list information 42 are separately generated and managed.

Also, the first version of the latest defect list information 40 is generated by getting the first piece of information that has been read from the optical disk medium 1 just loaded into the recording/reproduction apparatus 100 stored in the buffer 140 by the reading control section 130. In storing the latest defect list information 40, the certification control section 160 initializes the attribute-by-attribute total entry number information 43 and attribute-by-attribute entry top location pointer 44.

Figure 11:
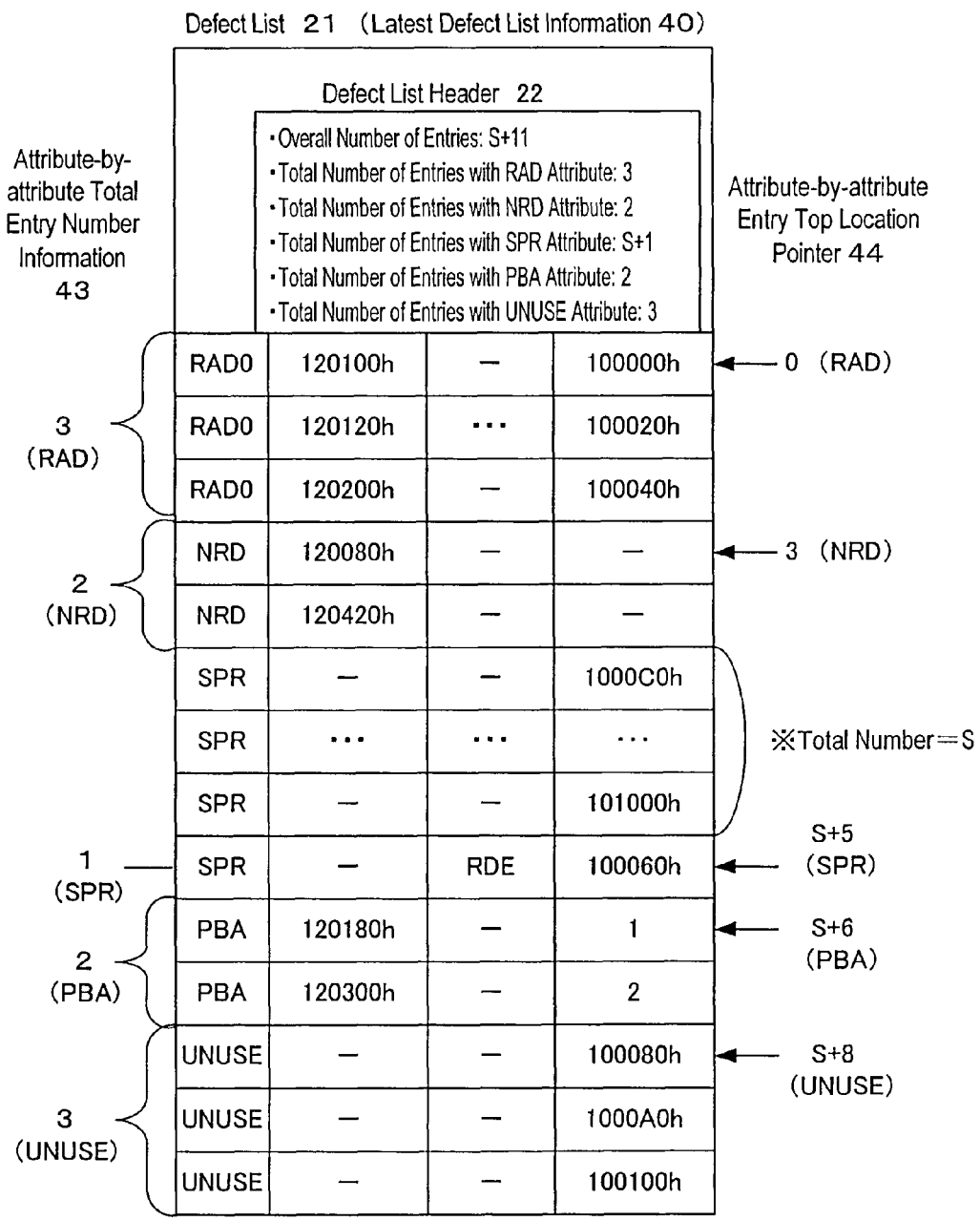
FIG. 11 shows a defect list according to the first preferred embodiment of the present invention.

As shown in FIG. 11, the attribute-by-attribute total entry number information 43 will be described. The attribute-by-attribute total entry number information 43 is comprised of respective pieces of total entry number information of the entry attributes 30 that are included in the defect list header 22.

In the defect list header 22, stored is information about the total number of entries, including defect entries 23 with the SPR attribute and not in the RDE state (i.e., not to be certified). That is why the top and end locations of the defect entries 23 with the SPR attribute and in the RDE state are searched for, and the number of defect entries 23 included between these two locations is defined as SPR attribute total entry number information for blocks to be certified.

The attribute-by-attribute entry top location pointer 44 can be set by calculating the top location of each attribute as an offset value from the top using the attribute-by-attribute total entry number information 43. Specifically, the offset value can be calculated by setting the location of the first one of the defect entries 23 included in the latest defect list information 40 to be zero. It should be noted that the top location of the SPR attribute defect entry 23 agrees with that of the defect entry 23 in the RDE state.

The latest defect list information 40 is updated when a defective block is newly detected from the optical disk medium 1 or when writing of data on a block that has been supposed to be defective is completed successfully.

In the following description, the writing control section 120, the reading control section 130 and the certification control section 150 will sometimes be referred to herein as a "control section" collectively. It should be noted that the respective components of the recording/reproduction apparatus 100 described above could be implemented by means of either hardware or software.

(2) Procedure of Quick-Certify Processing

Next, the procedure of the quick-certify processing will be described. According to this preferred embodiment, to get the quick-certify processing done through a single series of processing steps along the track path, certification target list information 41 in which the defect entries 23 are sorted by the physical addresses of the target blocks is generated and the certification processing is carried out in the order defined by this list information 41 without using the entry attributes 30.

Also, when the quick-certify processing is performed, the status bits and/or the PLA information of the replacement block are/is updated.

Figure 12:
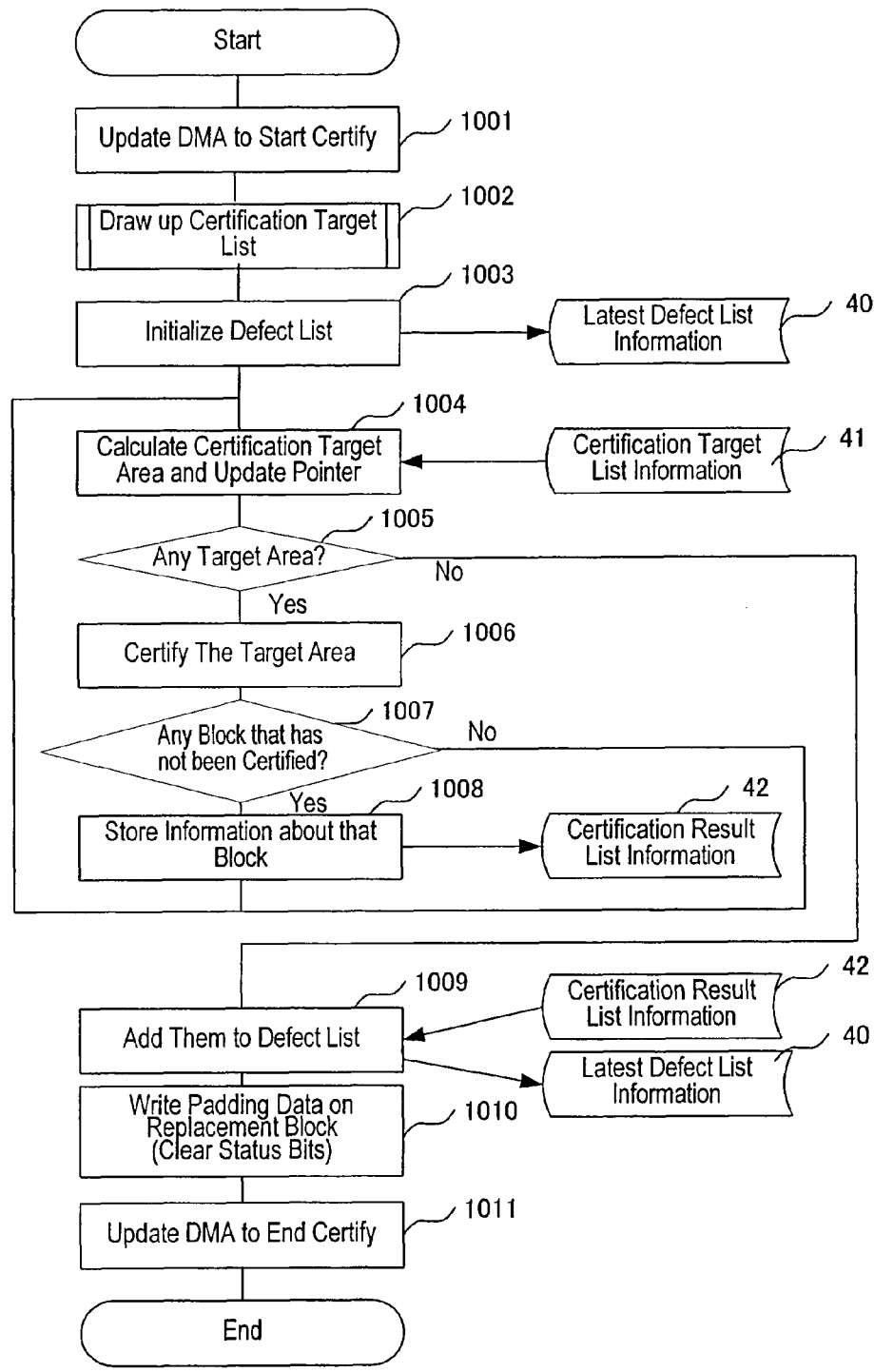
FIG. 12 is flowchart showing the procedure of quick-certify formatting processing according to the first preferred embodiment.

FIG. 12 is flowchart showing the procedure of the quick-certify formatting processing of this preferred embodiment.

Figure 1:
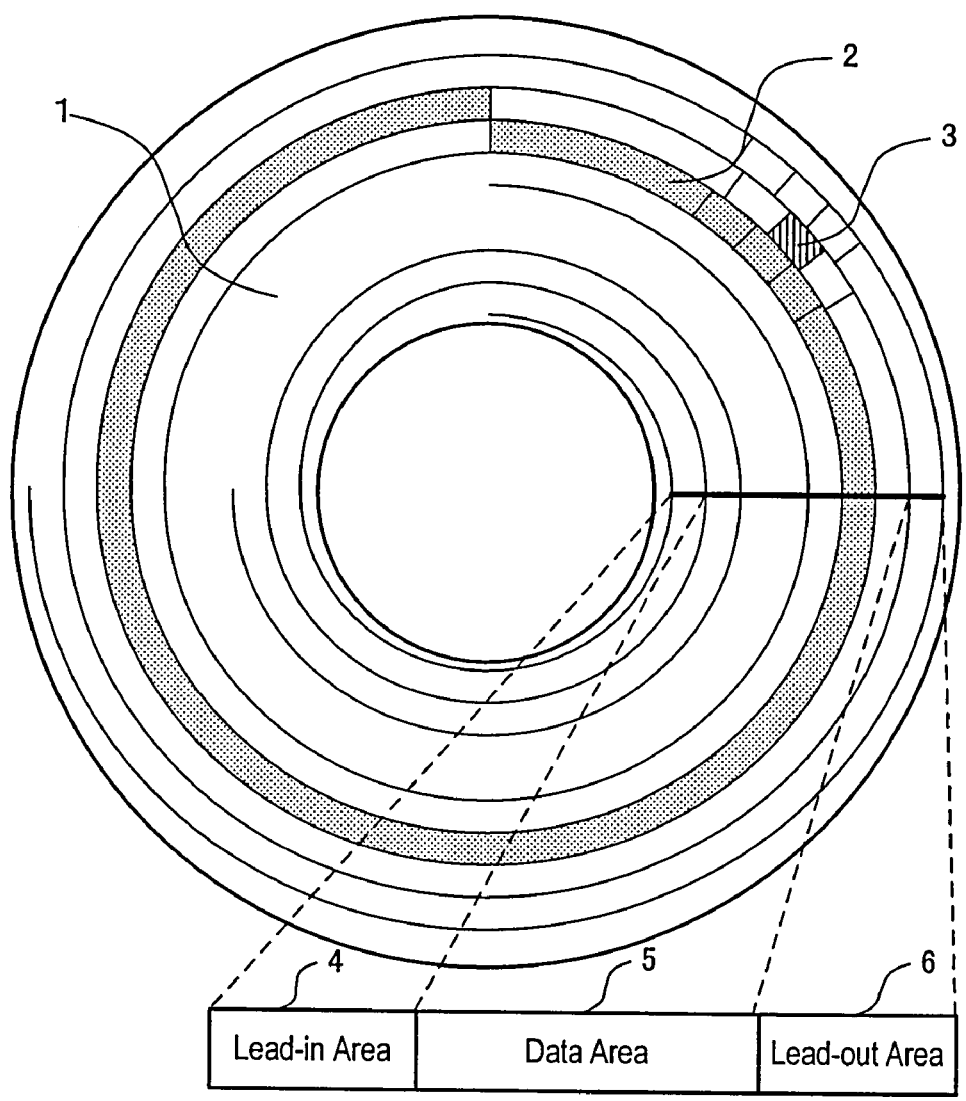
FIG. 1 illustrates an exemplary layout of areas on an optical disk medium.
Figure 2:
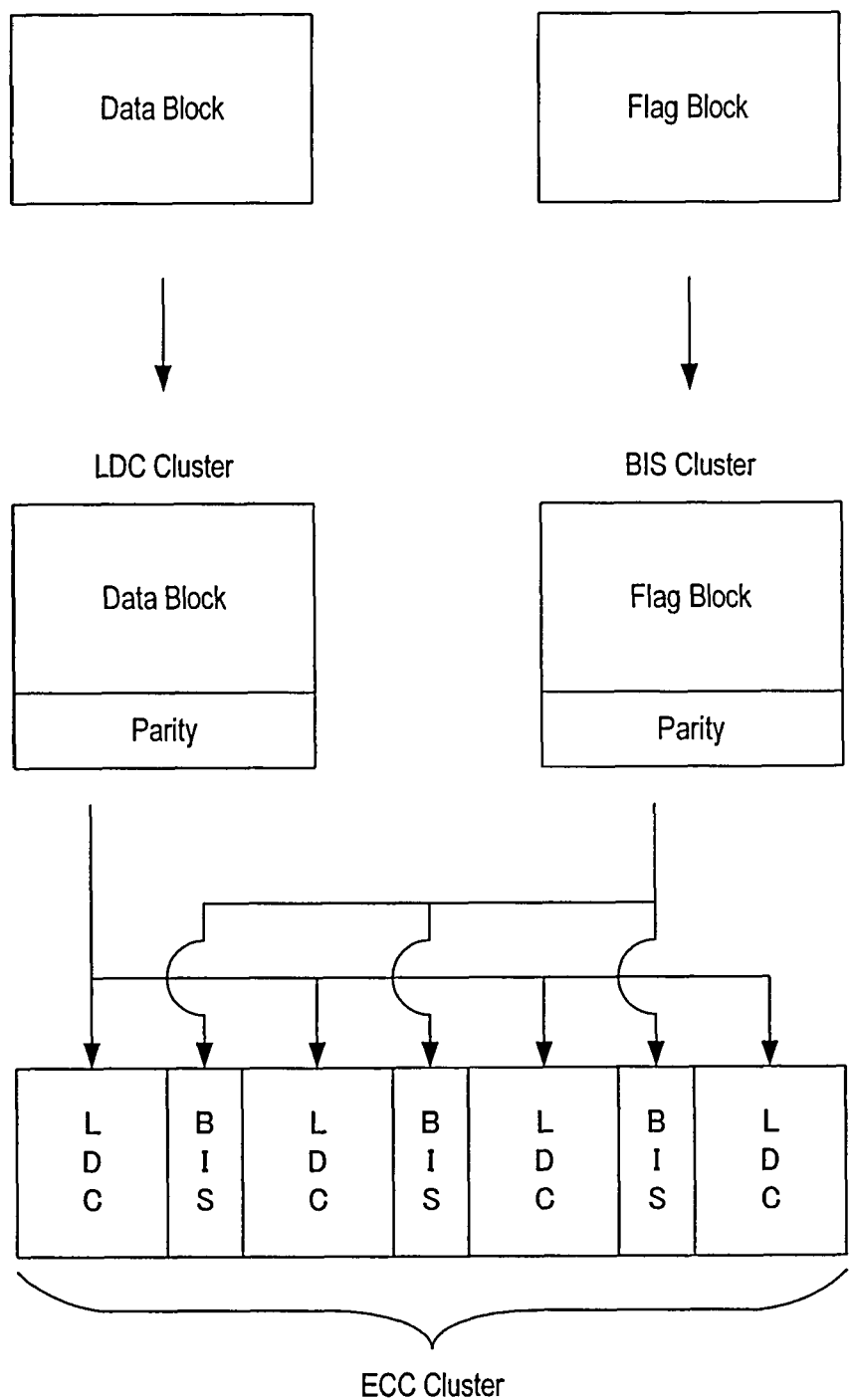
FIG. 2 shows a data format for a BD.
Figure 3:
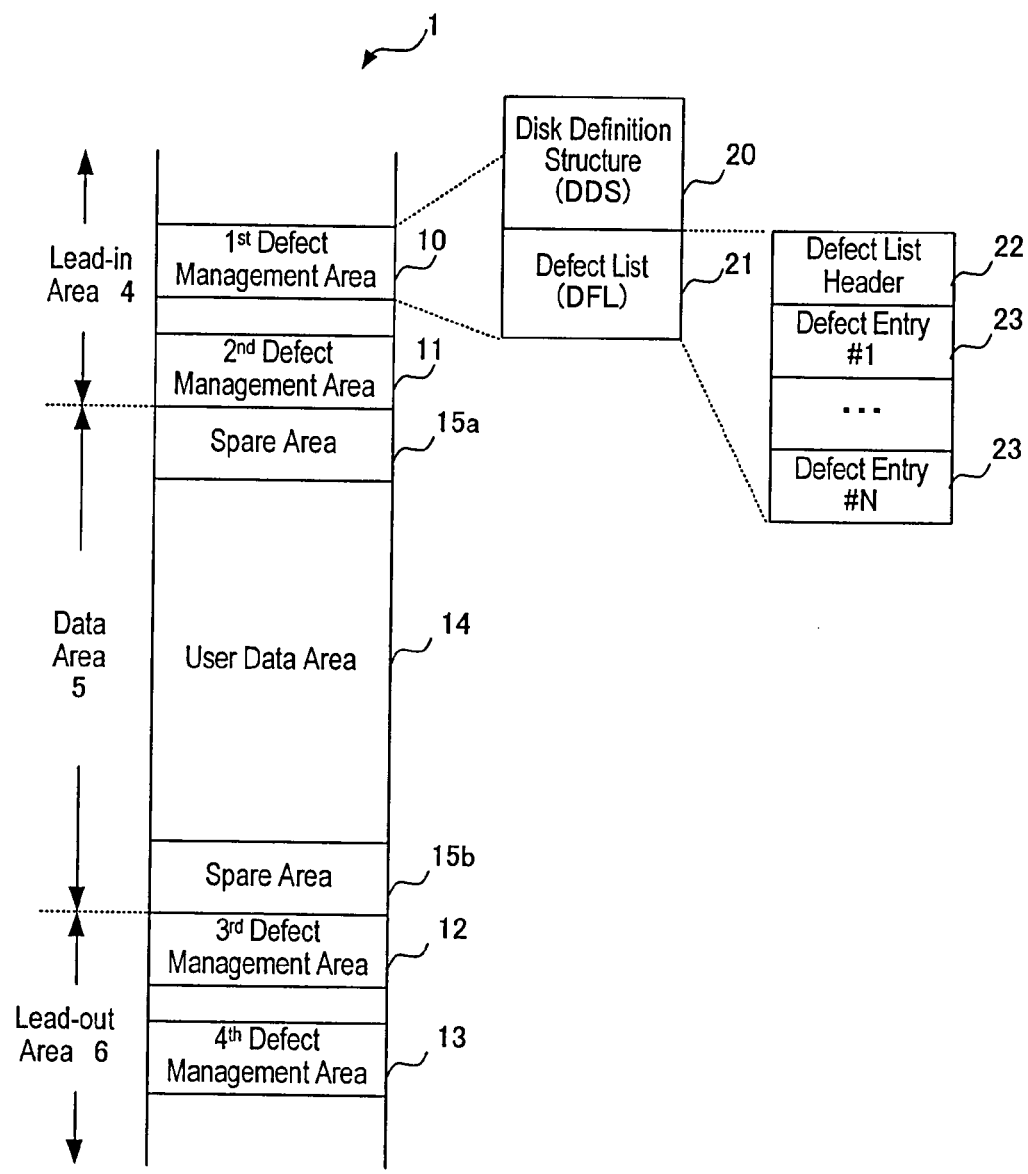
FIG. 3 shows the structure of an optical disk medium.

First, in Step 1001, the writing control section 120 updates the information stored in the defect management areas (DMAs). Specifically, in accordance with the instruction given by the certification control section 160, the writing control section 120 updates the disk definition structure 20 of the $1^{st}$ through $4^{th}$ DMAs (see FIG. 3) such that the structure includes a flag indicating that the certification processing is being carried out.

Next, in Step 1002, the certification control section 160 generates certification target list information 41. Specifically, the certification target area calculating section 161 figures out the location information of the block to be certified based on the latest defect list information 40 and adds it to the certification target list information 41 one after another.

Figure 13:
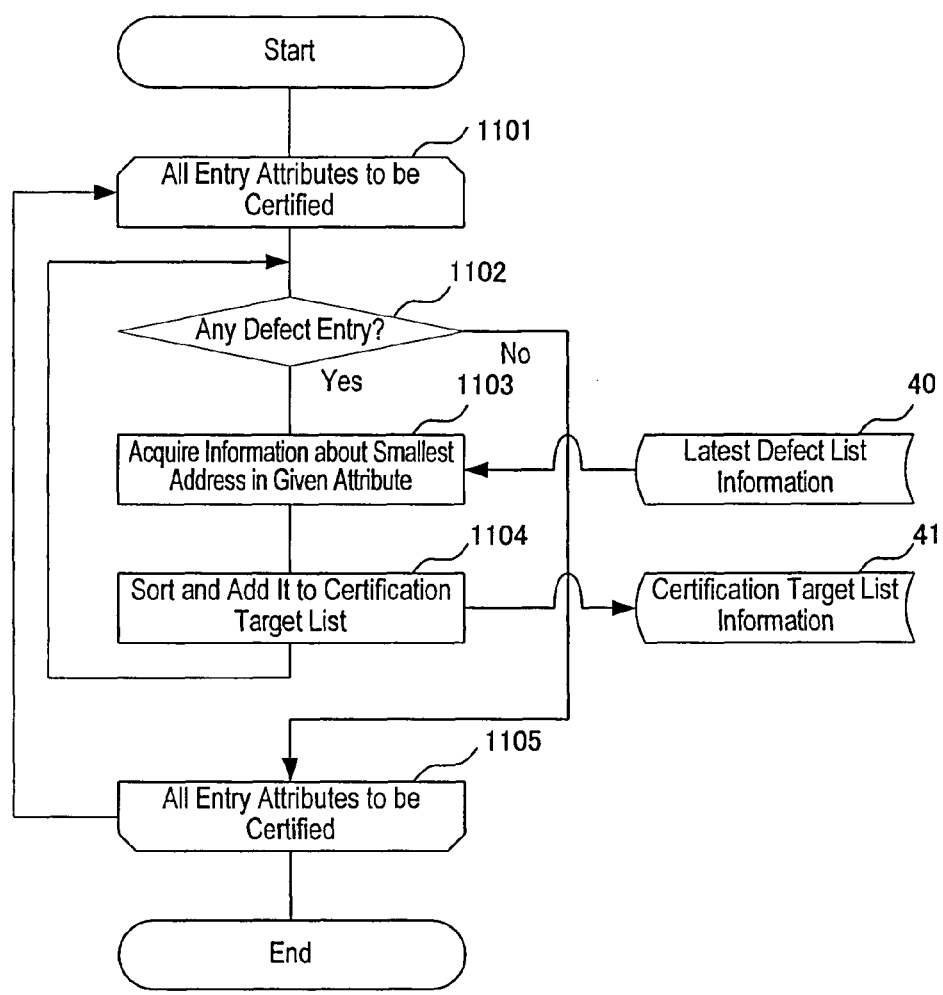
FIG. 13 is a flowchart showing the procedure of generating certification target list information according to the first preferred embodiment.

FIG. 13 is a flowchart showing the procedure of generating the certification target list information 41. FIG. 14 shows the details of the certification target list information 41.

In Step 1101, the defect entries 23 of all entry attributes 30 to be certified are repeatedly subjected to the following processing steps 1102 through 1104. Specifically, all defect entries 23 with the RAD, NRD, SPR (of which the sub-attribute is in the RDE state), PBA and UNUSE attributes that are placed on the defect list 21 are repeatedly subjected to the following processing steps on an attribute-by-attribute basis.

First, in Step 1102, the certification control section 160 determines whether or not there is any defect entry 23 that is yet to be added to the certification target list information 41 among the defect entries 23 with the given entry attribute 30. This decision can be made by seeing if a predetermined number of defect entries as specified by the attribute-by-attribute total entry number information 43 have all been added to the certification target list information 41. If the number of entries added so far is still short of the specified number, then it is determined that there are still some pieces of information yet to be added.

Next, in Step 1103, the certification target area calculating section 161 acquires information about the smallest physical address in the given entry attribute 30. As shown in FIG. 11, the respective defect entries 23 have been sorted by entry attributes 30 and each attribute-by-attribute entry top location pointer 44 indicates the top of the target of processing of its associated attribute. The physical address of the defective block in the defect entry 23 pointed to by the attribute-by-attribute entry top location pointer 44 is acquired. Also, on getting the physical address successfully, the certification target area calculating section 161 updates the attribute-by-attribute entry top location pointer 44 such that the pointer 44 points to the location of the next defect entry in the same attribute.

Next, in Step 1104, the certification target area calculating section 161 adds the physical address information that has been acquired in Step 1103 to the certification target list information 41. In this processing step, the physical address information is added such that the certification target list information 41 has been sorted in the ascending order by physical address information. When the physical address information is added, the process goes back to the processing step 1102.

Finally, in Step 1105, if not all of the entry attributes 30 to be certified have been processed yet, the process goes back to the processing step 1101 with a target set on the next entry attribute 30. On the other hand, if all of those entry attributes 30 to be certified have already been processed, then the process ends.

As shown in FIG. 14, the top physical addresses (each of which is a piece of four-byte information) of the defective blocks that have been added to all defect entries 23 but a defect entry with the SPR attribute (i.e., of which the sub-attribute is not RDE) are extracted and are sorted by physical addresses irrespective of the types of the entry attributes 30, thereby generating certification target list information 41. As for a defect entry 23 with the PBA attribute that could cover a plurality of blocks, the top physical addresses of all blocks that are included in that designated area are extracted and added to the certification target list information 41.

In the example shown in FIG. 14, the certification target list information 41 is supposed to be a list consisting of only four-byte physical address information to be certified. However, the certification target list information 41 does not have to be such a list. Alternatively, to manage a number of consecutive areas collectively, the information may also be managed in a format in which the top physical address information and the number of continuous blocks are combined.

Identification information marking the end (which is a value that can never be a physical address such as a four-byte value FFFFFFFFh according to the hexadecimal notation) is added to the end of the certification target list information 41.

The rest of the quick-certify formatting processing will be described with reference to FIG. 12 again.

In Step 1003, the certification control section 160 initializes information about its defect list 21, i.e., the latest defect list information 40. Specifically, the latest defect list information 40 should be information about a defect list 21 consisting of only defect entries 23 with the SPR attribute (of which the sub-attribute 32 is not in the RDE state and), of which the replacement's location information 33 designates all blocks in the spare areas 15a and 15b, with no defect entries 23 with other entry attributes 30.

In Step 1004, the certification target area calculating section 161 figures out the certification target area. Specifically, the certification target area calculating section 161 calculates the physical address to start the certification processing at and the number of continuous blocks based on the certification target list information 41 that has been generated in Step 1002. For example, in the certification target list information 41 shown in FIG. 14, physical addresses 100060h, 100080h and 1000A0 are continuous with each other, and therefore, the certification start physical address is figured out to be 100060h and the number of continuous blocks is calculated three.

If the physical address information included in the certification target list information 41 designates a number of continuous blocks, then the number of those blocks is also added to the number of continuous blocks.

In this manner, the certification processing can be performed on a number of continuous blocks collectively. As a result, the processing performance can be improved compared to a situation where the certification processing is performed on a block-by-block basis.

Optionally, the certification target area calculating section 161 may have a pointer that points to the physical address to be certified next in the list information 41. This pointer points to the top physical address in the certification target list information 41 in the initial state but is updated so as to point to the next uncalculated physical address once the certification target area with the physical address pointed to by the pointer has been figured out. By using such a pointer, when the processing step 1004 needs to be carried out next time, the certification target area can be figured out easily.

Next, in Step 1005, the certification control section 160 determines whether or not there is a certification target area. Specifically, if the certification start physical address that has been calculated in Step 1004 is a physical address on the disk (i.e., unless the address calculated is FFFFFFFFh that marks the end) or unless the number of continuous blocks is zero, the certification control section 160 determines that there is a certification target area.

Subsequently, in Step 1006, if it has been determined that there is a certification target area, the certification control section 160 carries out certification processing on that area. Specifically, the certification control section 160 instructs the certification executing section 170 to execute certification processing on the area that has been figured out in Step 1004. In accordance with the instruction, the certification executing section 170 executes the certification processing on that area.

Thereafter, in Step 1007, based on the result of the certification processing that has been done by the certification executing section 170, the certification control section 160 determines whether or not there is an area that has not been certified successfully.

If it has been determined that there is an area that has not been certified successfully, then the certification control section 160 stores, in Step 1008, information indicating that area that has caused an error in the certification processing. Specifically, the certification control section 160 adds the top physical address of the block that has caused an error to the certification result list information 42.

If the address of the block that has caused an error has been added to the certification result list information 42 or if it has been determined in Step 1007 that there is no block that has caused an error, then the process goes back to the processing step 1004. After that, the same series of processing steps 1004 through 1008 are repeatedly performed until it is determined in Step 1005 that there is no certification target area anymore.

Then, in Step 1009, the defect entry handling section 162 places all areas that have caused an error as a result of the certification processing on the defect list 21. Specifically, the defect entry handling section 162 adds a defect entry 23, in which all blocks with the physical addresses included in the certification result list information 42 are listed as defective blocks, to the latest defect list information 40. If the block that has caused an error is located within the user data area 14, then a defect entry 23 with the RAD0 attribute, of which the defect location information 31 is defined by its physical address, is generated. On the other hand, if the block that has caused an error is located within the spare area 15, then a defect entry 23 with UNUSE attribute, of which the replacement's location information 33 is defined by its physical address, is generated. At the same time, the attribute-by-attribute total entry number information 43 included in the defect list header 22 on an entry attribute basis is also updated.

When the processing step 1009 is finished, the latest defect list information 40, reflecting the result of the certification processing, is generated.

The defect entry handling section 162 selects the best one of the blocks that are listed on the replacement's location information 33 of the defect entry 23 with the SPR attribute and assigns it as a replacement block for the defect entry 23 with the RAD0 attribute. As a result, the defect entry 23 with the SPR attribute, in which that block that has been selected as the replacement block has been listed, should be deleted. Optionally, the defect entry 23 with the SPR attribute may be replaced with the defect entry 23 with the RAD0 attribute.

In this case, the "best block" is a block that is located closest to (i.e., at the shortest radial distance from) the original block. Alternatively, the best block may also be a block with the closest physical address. In any case, the best block is appropriately selected according to how the disk is used at that point in time.

In the same way, when a defect entry 23 with the UNUSE attribute is placed on the list, the defect entry 23 with the SPR attribute, in which the blocks that are included in the defect entry 23 with the UNUSE attribute have been listed, should be deleted. Optionally, the defect entry 23 with the SPR attribute may be replaced with the defect entry 23 with the UNUSE attribute.

Figures 6A, 6B:
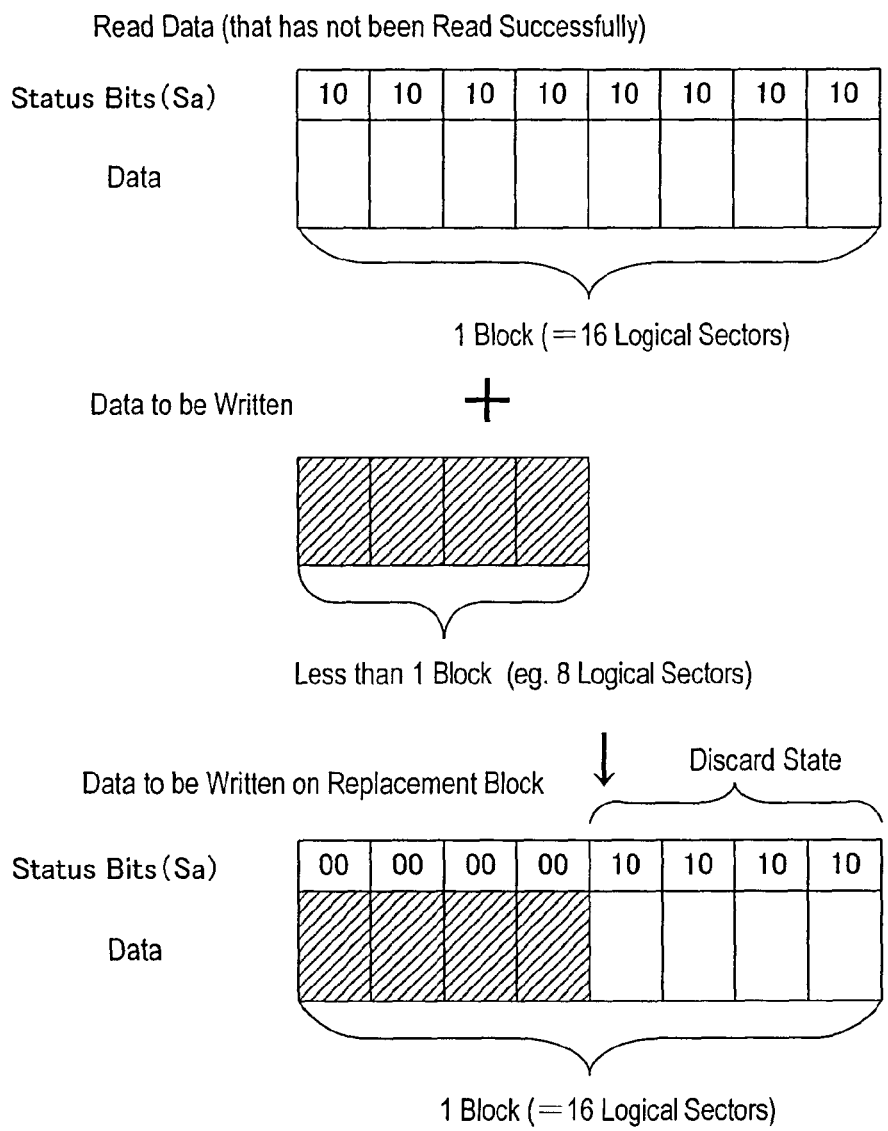
FIG. 6A and FIG. 6B show status bits.
Figure 7A:
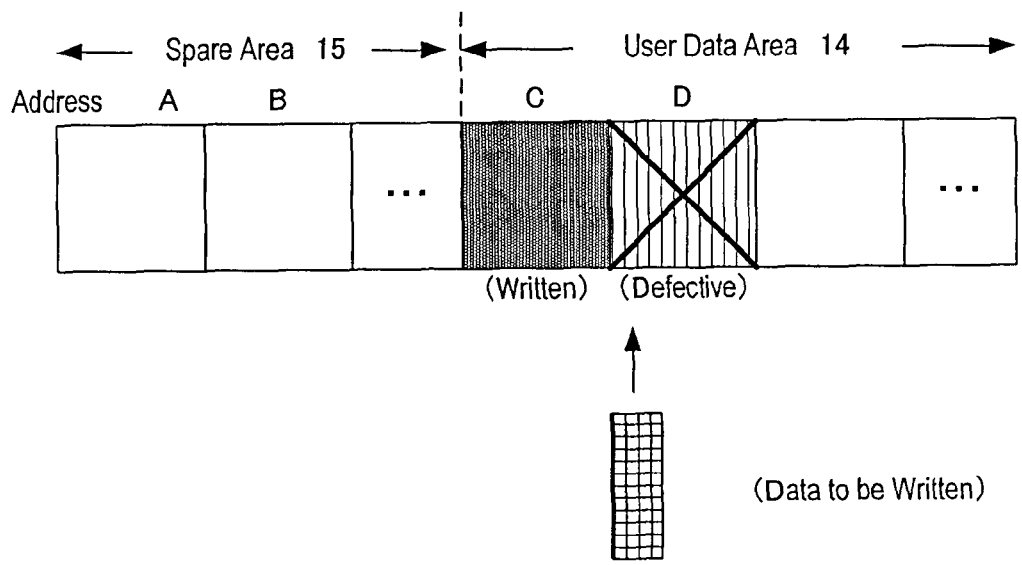
FIG. 7A and FIG. 7B show a correlation between PLA and defect entries.
Figure 7B:
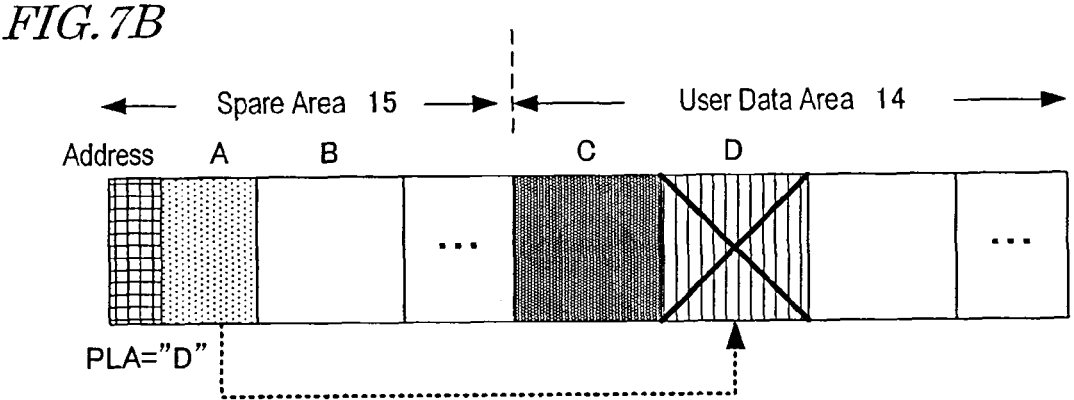
Figure 8A:
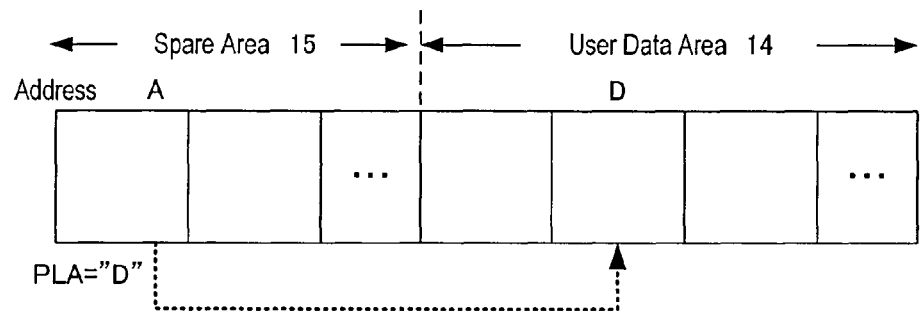
FIG. 8A and FIG. 8B show how to perform complementing processing on data in discard state.
Figure 8B:

Subsequently, in Step 1010, the certification control section 160 clears the flag information representing the status bits (see FIG. 6) of the block that has been assigned as a replacement block. As used herein, "to clear" means rewriting the flag information to indicate that all valid data is included in that block. More specifically, the clearance target area calculating section 163 calculates the physical address information of the replacement block, specified by the defect entry 23 with the RAD0 attribute, and changes the status bits of the replacement block into a value other than "10" (see FIG. 6A). For example, the certification control section 160 instructs the writing control section 120 to write padding data (which is arbitrary data with no substantive meaning) in the replacement block designated by the defect entry 23 with the RAD0 attribute. In accordance with this instruction, the writing control section 120 changes the values of the status bits into "11" representing padding attribute.

Next, in Step 1011, the writing control section 120 updates the defect management areas (DMAs). Specifically, the certification control section 160 instructs the writing control section 120 to write the latest defect list information 40 that has been generated in Step 1009 in the DMAs as the defect list 21. In accordance with this instruction, the writing control section 120 writes the defect list in the $1^{st}$ through $4^{th}$ DMAs. Also, in this processing step, the flag included in the disk definition structure 20 to indicate that the certification processing is being carried out is cleared.

The quick-certify processing is completed by performing these processing steps.

Figure 9:
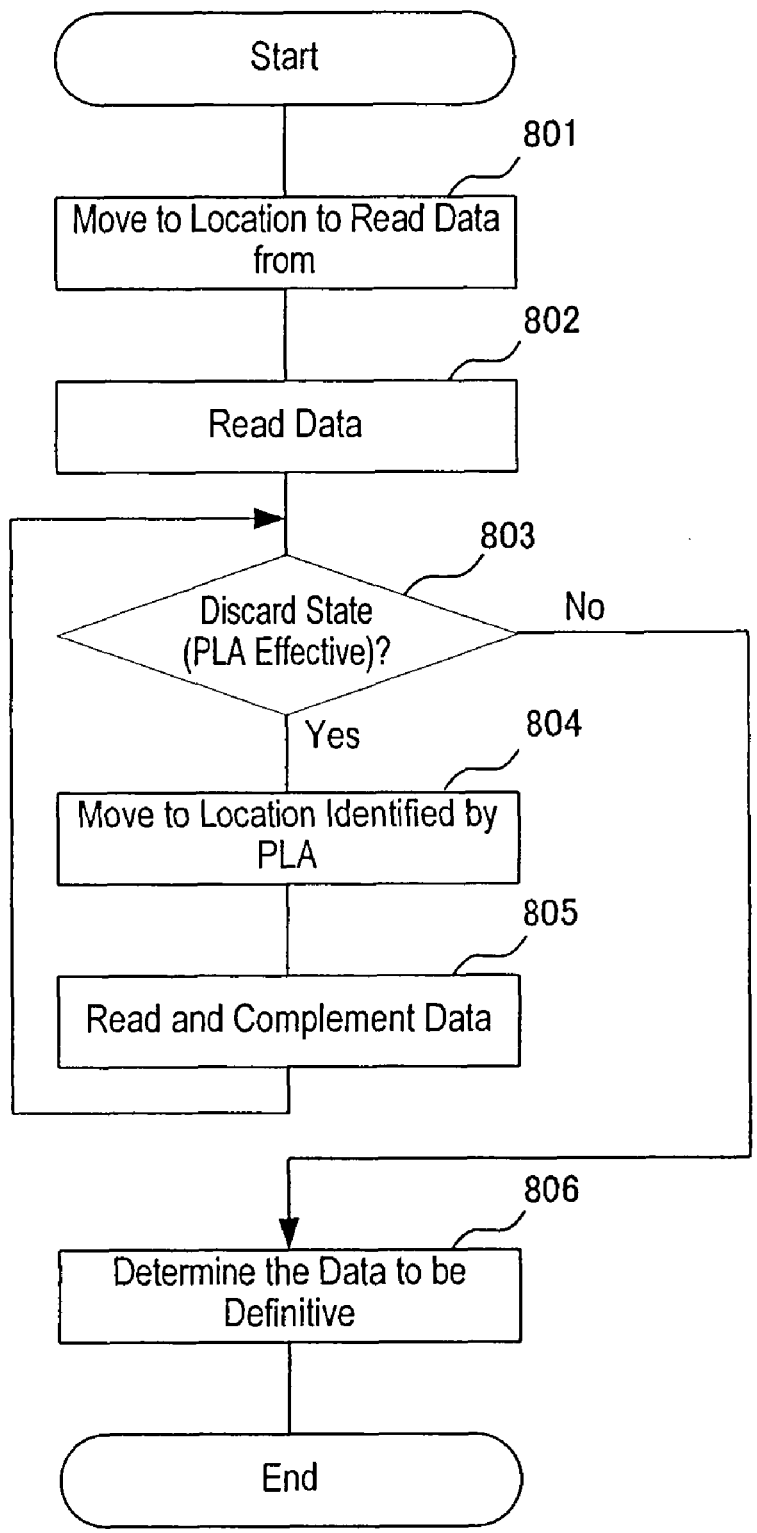
FIG. 9 is a flowchart showing the procedure of PLA tracing processing.

As described above, in performing the quick-certify formatting processing, the status bits of the replacement block in the defect entry 23 with the RAD0 attribute are rewritten into a value other than "10", i.e., changed into non-discard state. In the processing step 803 of the PLA tracing processing (see FIG. 9), if the read data turns out to be in non-discard state, the original block identified by the PLA is never accessed. That is why by rewriting the status bits of the replacement block into a value other than "10" (i.e., so as to indicate that the PLA is null), there is no need to perform unnecessary PLA tracing processing in vain in reading the replacement block. As a result, the processing performance improves.

Optionally, the unnecessary PLA tracing processing may also be omitted by rewriting the PLA into dummy information. For example, if the process advances from the processing step 803 to the processing step 806 after the PLA has been rewritten into a null value, which is not the physical address of the original block, the unnecessary PLA tracing processing can be omitted.

In addition, by generating certification target list information 41 in which the defective blocks to be certified have been sorted by physical addresses along the track path and by performing the certification processing in the order defined by that list, all target blocks can get certified through a single series of processing steps along the track path. As a result, the processing performance improves.

In the foregoing description, the certification target list information 41 is supposed to be a list consisting of only four-byte physical address information of the blocks to be certified. However, the list information 41 does not have to be such a list. For instance, to manage continuous areas collectively, information may also be managed in a format in which the top physical address information and the number of continuous blocks are combined with each other. Likewise, the certification result list information 42 is also supposed to be a list consisting of only four-byte physical address information of the blocks that have caused an error as a result of the certification processing. However, the list information 42 does not have to be such a list. For instance, to manage continuous areas collectively, information may also be managed in a format in which the top physical address information and the number of continuous blocks are combined with each other.

Also, the data to be written in Step 1010 (see FIG. 12) does not have to be padding data. As long as the status bits are rewritten into data other than "10", All 00h data, of which the status bits are "00", may be written, for example.

Furthermore, in the processing step 1010, there is no need to rewrite all data of the target blocks, but at least the status bits of the target blocks need to be changed into a value other than "10". For example, the processing step 1010 may be the step of rewriting only the status bits into "11".

Furthermore, in the processing step 1010, only the replacement block in the defect entry 23 with the RAD0 attribute is supposed to have its status bits updated. However, all blocks in that spare area that could be used as replacement blocks may be subjected to such processing. Alternatively, only the status bits of the replacement block in the discard state may be updated.

Moreover, in the processing steps 1008 and 1009, the blocks that have caused an error as a result of the certification processing are placed on the certification result list information 42. And after the certification processing on all certification target areas has been done, all blocks that have caused an error are added to the latest defect list information 40. However, it is not always necessary to take this processing procedure. For example, without using the certification result list information 42, the processing step 1009 may be carried out right after the processing step 1008 has been done. That is to say, every time a block that has caused an error is detected as a result of the certification processing, its associated defect entry 23 may be added to the latest defect list information 40.

Meanwhile, formatting processing called "quick reformat" is known as another type of formatting processing for a BD-RE. In this quick reformat processing, all defect entries 23 on the list are re-listed as defect entries 23 with the PBA attribute in the RDE state or defect entries 23 with the SPR attribute in the RDE state. This processing can be done just by partially modifying the procedure of the quick-certify processing described above. For example, without performing the processing step 1006 (see FIG. 12), the blocks are always determined to have caused an error in Step 1007 and the defective blocks are placed on the certification result list information 42. Next, in the processing step 1009, the defective blocks in the user data area are listed as defect entries 23 with the PBA attribute in the RDE state. Also, the defective blocks in the spare area are listed as defect entries 23 with the SPR attribute in the RDE state. In this manner, the "quick reformat" processing can get done. By performing the "quick reformat" processing by using a portion of the quick-certify processing procedure described above, it is possible to prevent the processor from getting complicated too much.

Embodiment 2

(1) Recording/Reproduction Apparatus

Figure 15:
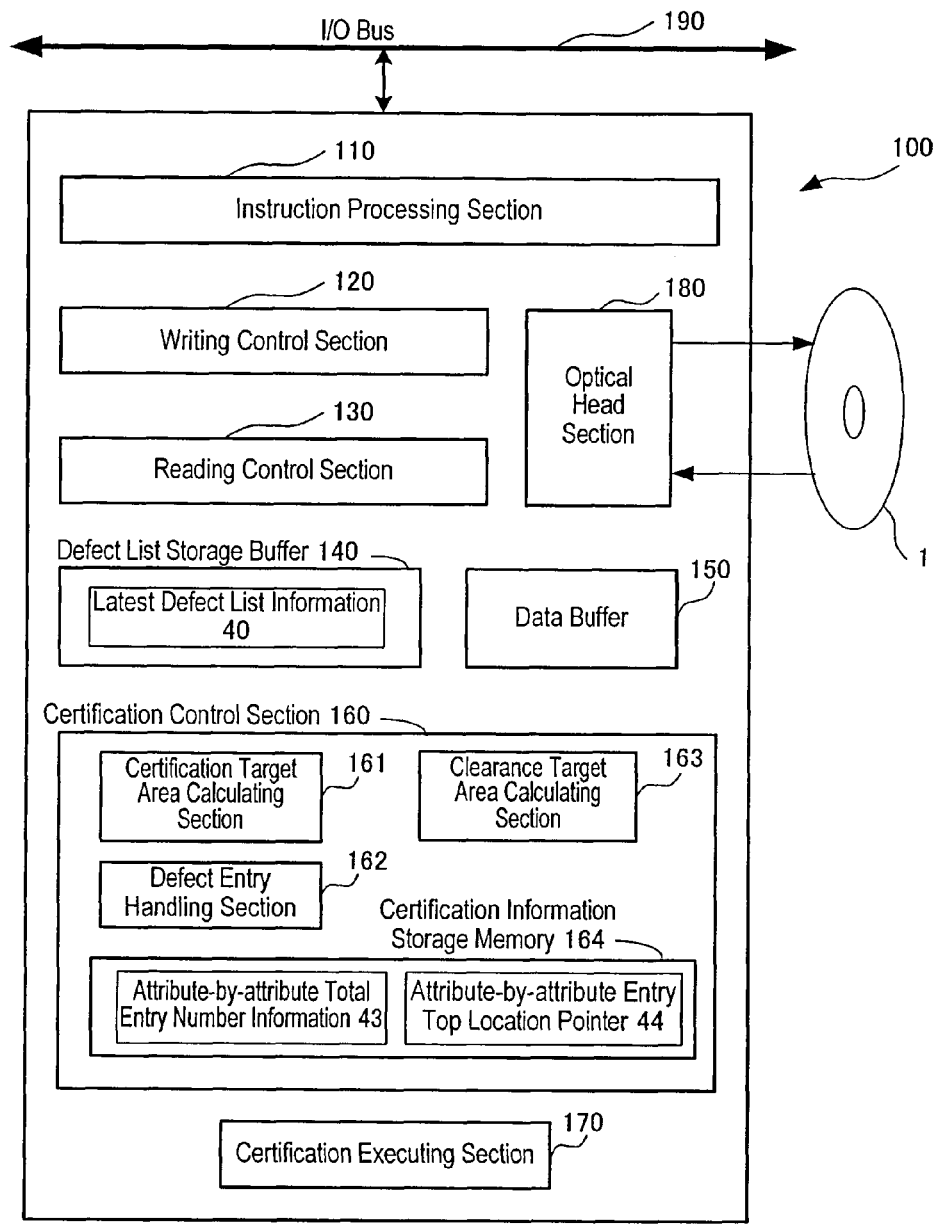
FIG. 15 shows the arrangement of functional blocks in a recording/reproduction apparatus according to a second preferred embodiment of the present invention.

Hereinafter, a recording/reproduction apparatus according to a second preferred embodiment of the present invention will be described. FIG. 15 shows the arrangement of functional blocks in a recording/reproduction apparatus 100 according to the second preferred embodiment. The recording/reproduction apparatus 100 of the second preferred embodiment includes the same components as the counterpart 100 of the first preferred embodiment described above. According to this preferred embodiment, however, neither the certification target list information 41 nor the certification result list information 42 is stored in the certification information storage memory 164. Also, the program of the processing carried out by the certification control section 160 of the second preferred embodiment is different from that of the first preferred embodiment described above. The details of the processing will be described later.

As in the processing of the first preferred embodiment described above, the attribute-by-attribute total entry number information 43 and attribute-by-attribute entry top location pointer 44 are initialized by the certification control section 160 using the latest defect list information 40.

(2) Procedure of Quick-Certify Processing

In this preferred embodiment, by using the information in the defect list 21 as it is, the quick-certify processing gets done through a single series of processing steps along the track path and the status bits and/or the PLA information of the replacement block are/is updated.

Figure 16:
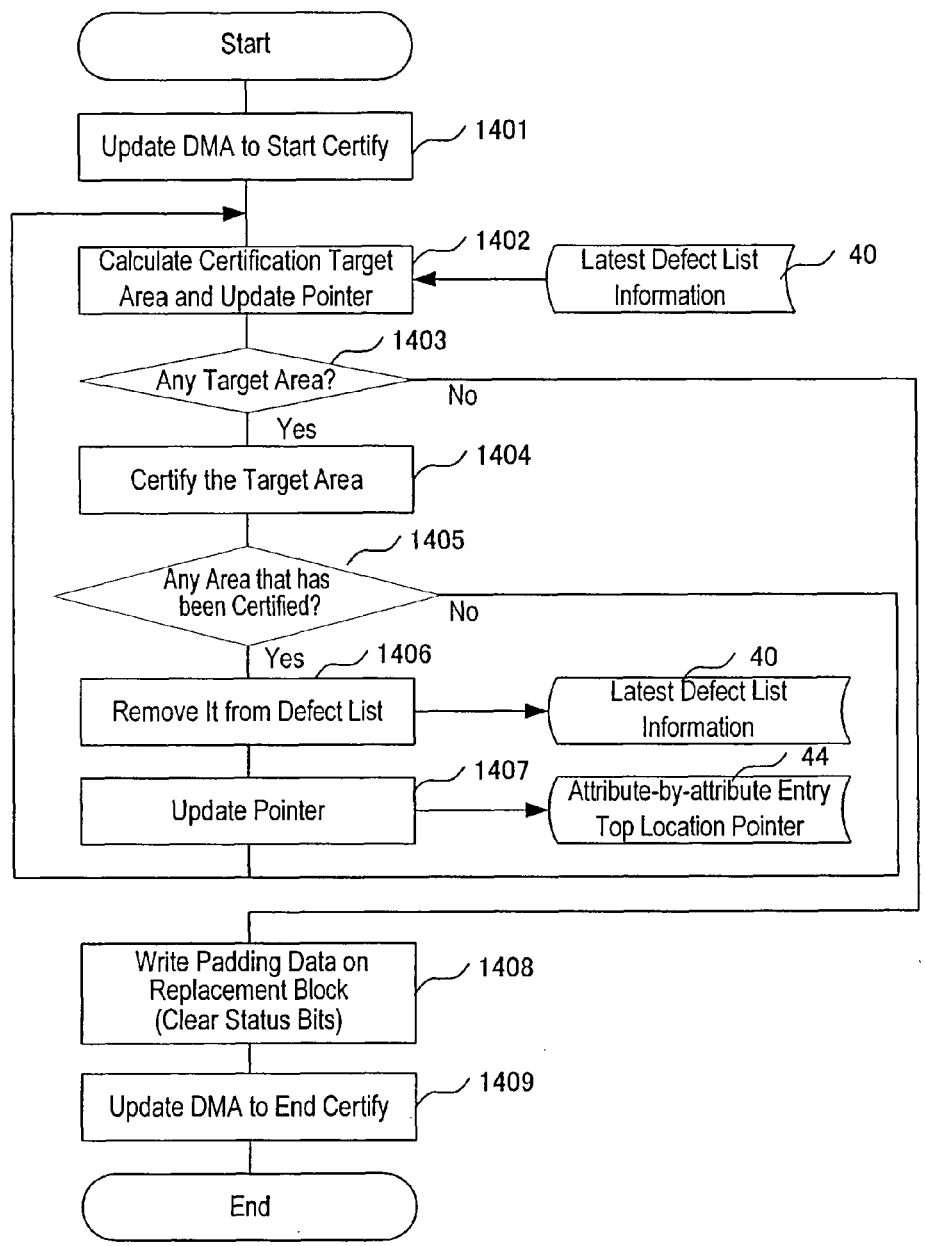
FIG. 16 is flowchart showing the procedure of quick-certify formatting processing according to the second preferred embodiment.

FIG. 16 is a flowchart showing the procedure of quick-certify formatting processing according to this preferred embodiment. FIG. 17 shows an example of a defect list 21 (latest defect list information 40).

First, in Step 1401, the writing control section 120 updates the information stored in the defect management areas (DMAs). Specifically, in accordance with the instruction given by the certification control section 160, the writing control section 120 updates the disk definition structure of the $1^{st}$ through $4^{th}$ DMAs (see FIG. 3) such that the structure includes a flag indicating that the certification processing is being carried out.

Next, in Step 1402, the certification target area calculating section 161 figures out the certification target area. Specifically, the certification target area calculating section 161 finds the smallest one of the physical addresses of the blocks pointed to by the attribute-by-attribute entry top location pointer 44 (see FIG. 17) and regards the physical address of that block as certification start physical address information. Also, the pointer 44 is updated so as to point to the next one that follows the block with the smallest physical address (i.e., a block with the same entry attribute).

If one of the blocks pointed to by the updated pointer 44 has a physical address that is continuous with the smallest physical address of the previously selected block, then the number of continuous blocks is calculated as in the processing step 1004 (see FIG. 12). Then a plurality of continuous blocks can be certified collectively. As a result, the processing performance can be improved compared to a situation where the certification processing is performed on a block-by-block basis.

In the list shown in FIG. 17, for example, the smallest one of the physical addresses of the blocks to be certified is 100060h of the block with the SPR attribute and in the RDE state. Since the physical addresses 100080h and 1000A0h of blocks with the UNUSE attribute are continuous with this physical address 100060h, the certification start physical address is figured out to be 100060h and the number of continuous blocks is calculated three.

If there are no certification target areas, the certification start physical address is figured out to be FFFFFFFFh or the number of continuous blocks is calculated zero.

Next, in Step 1403, the certification control section 160 determines whether or not there is a certification target area. Specifically, if the certification start physical address information that has been calculated in Step 1402 is physical address information on the disk (i.e., unless the address calculated is FFFFFFFFh that marks the end) or unless the number of continuous blocks is zero, the certification control section 160 determines that there is a certification target area.

Subsequently, in Step 1404, if it has been determined that there is a certification target area, the certification control section 160 carries out certification processing on that area. Specifically, the certification control section 160 instructs the certification executing section 170 to execute certification processing on the area that has been figured out in Step 1402. In accordance with the instruction, the certification executing section 170 executes the certification processing on that area.

Thereafter, in Step 1405, based on the result of the certification processing done by the certification executing section 170, the certification control section 160 determines whether or not there is an area that has been certified successfully.

If it has been determined that there is an area that has been certified successfully, then the defect entry handling section 162 either removes the defect entry 23, associated with that successfully certified area (or block), from the latest defect list information 40 or updates the defect entry 23 in the next processing step 1406.

For example, if a block in the defect entry 23 with the RAD0 attribute has been certified successfully, then the defect entry handling section 162 re-lists the replacement block of that defect entry 23 as a defect entry 23 with the SPR attribute (and not in the RDE state) and deletes the defect entry 23 with the RAD0 attribute. Alternatively, the defect entry handling section 162 may replace the defect entry 23 with the RAD0 attribute with a defect entry 23 with the SPR attribute (and not in the RDE state).

Likewise, if a block in the defect entry 23 with the UNUSE attribute or SPR attribute (in the RDE state) has been certified successfully, the replacement block is re-listed as a defect entry 23 with the SPR attribute (and not in the RDE state) and the defect entry 23 with the UNUSE attribute or with the SPR attribute (in the RDE state) is deleted. Alternatively, the defect entry 23 with the UNUSE attribute or the SPR attribute (in the RDE state) is replaced with a defect entry 23 with the SPR attribute (and not in the RDE state).

If a block in a defect entry 23 with the NRD attribute has been certified successfully, that defect entry 23 is deleted.

And if the entire area that is listed on the defect entry 23 with the PBA attribute has been certified successfully, then the defect entry 23 is deleted. On the other hand, if a part of the area that is listed on the defect entry 23 with the PBA attribute has been certified successfully, then the blocks that have been certified successfully are re-listed as a defect entry 23 with the PBA attribute that indicates the number of continuous blocks deleted.

Next, in Step 1407, the certification control section 160 updates the pointer information. Specifically, as the defect entries 23 have been deleted and/or updated in the processing step 1406, the certification control section 160 updates not only the attribute-by-attribute entry top location pointer 44 but also the attribute-by-attribute total entry number information 43 of each entry attribute 30 in the defect list header 22.

After the attribute-by-attribute entry top location pointer 44 has been updated or if it has been determined in the processing step 1405 that there is no block that has been certified successfully, the process goes back to the processing step 1402. And the same series of processing steps 1402 through 1407 are carried out repeatedly until it is determined in the processing step 1403 that there are no certification target areas.

Subsequently, in Step 1408, the certification control section 160 clears the status bits (see FIG. 6) of the replacement block. More specifically, the clearance target area calculating section 163 finds the physical address information of the replacement block, specified by the defect entry 23 with the RAD0 attribute, among the defect entries 23 of the blocks that have not been certified successfully, and changes the status bits of the replacement block into a value other than "10" (see FIG. 6A). For example, the certification control section 160 instructs the writing control section 120 to write padding data in the replacement block designated by the defect entry 23 with the RAD0 attribute. In accordance with this instruction, the writing control section 120 changes the values of the status bits into "11" representing padding attribute.

Next, in Step 1409, the writing control section 120 updates the defect management areas (DMAs). Specifically, the certification control section 160 instructs the writing control section 120 to write the latest defect list information 40 that has been generated in Steps 1402 through 1407 in the DMAs as the defect list 21. In accordance with this instruction, the writing control section 120 writes the defect list in the $1^{st}$ through $4^{th}$ DMAs. Also, in this processing step, the flag included in the disk definition structure 20 to indicate that the certification processing is being carried out is cleared.

The quick-certify processing is completed by performing these processing steps.

As described above, in performing the quick-certify formatting processing, the status bits of the replacement block in the defect entry 23 with the RAD0 attribute are rewritten into a value other than "10", i.e., changed into non-discard state. Thus, there is no need to perform unnecessary PLA tracing processing in vain in reading the replacement block. As a result, the processing performance improves.

In addition, by performing the certification processing on all defective blocks to be certified one-dimensionally, i.e., in the order of physical addresses along the track path, all target blocks can get certified through a single series of processing steps along the track path. As a result, the processing performance improves.

The data to be written in Step 1408 (see FIG. 15) does not have to be padding data. As long as the status bits are rewritten into data other than "10", All 00h data, of which the status bits are "00", may be written, for example.

Furthermore, in the processing step 1408, there is no need to rewrite all data of the target blocks, but at least the status bits of the target blocks need to be changed into a value other than "10". For example, the processing step 1408 may be the step of rewriting only the status bits into "11".

Furthermore, in the processing step 1408, only the replacement block in the defect entry 23 with the RAD0 attribute is supposed to have its status bits updated. However, all blocks in that spare area that could be used as replacement blocks may be subjected to such processing.

Optionally, instead of the processing that has been described for the first and second preferred embodiments, the processing of certifying all target blocks at a time along the track path may be performed by finding a block with the smallest physical address in the defect list 21 a number of times.

In the processing of the first and second preferred embodiments described above, the certification processing is performed along the track path in the ascending order, i.e., beginning with a block with the smallest physical address. However, the present invention is in no way limited to those specific preferred embodiments. The same effects are achieved even if the certification processing is sequentially performed on a block with the largest physical address first, i.e., in the descending order, by following the track path in the opposite direction.

Also, the processing of the first and second preferred embodiments described above is supposed to be applied to a BD-RE, which is a rewritable BD. However, the processing of the present invention described above is applicable not just to a BD-RE but also to any other storage medium that has the same piece of information as the flag bits (status bits) of a BD-RE.

Also, the processing of the first and second preferred embodiments described above is supposed to be quick-certify formatting processing. However, the present invention is in no way limited to those specific preferred embodiments. Alternatively, the present invention is applicable to any other type of processing as long as there are defect entries designating replacement blocks (i.e., with the RAD attribute) after the formatting processing.

The present invention can be used particularly effectively in the field of technology related to information storage medium formatting processing.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2006-196356 filed Jul. 19, 2006 and No. 2007-184726 filed Jul. 13, 2007, the entire contents of which are hereby incorporated by reference.

What is claimed is:

1. An apparatus for performing formatting processing on an information storage medium,
the storage medium including a plurality of blocks, to each of which a physical address is assigned and some of which have been detected as defective blocks,
the storage medium also including a defect management area to store a defect list in which the defective blocks are classified according to types of their attributes,
the apparatus comprising a control section for controlling the formatting processing, the formatting processing including defective block processing in which the defect list is updated in accordance with a status of the defective blocks,
wherein the control section performs the defective block processing on two or more of the defective blocks with mutually different attributes in the order of their physical addresses.

2. The apparatus of claim 1, wherein the control section creates a list in which the defective blocks that have been classified according to the types of their attributes are sorted by physical addresses and performs the defective block processing using the list.

3. The apparatus of claim 2, wherein the control section performs the defective block processing collectively on a number of defective blocks that have consecutive physical addresses.

4. The apparatus of claim 2, wherein in performing the defective block processing, the control section stores a piece of information, which designates a next defective block to be subjected to the defective block processing, on an attribute-by-attribute basis.

5. The apparatus of claim 1, wherein the defective block processing is quick-certify processing, and the control section performs the quick-certify processing on two or more of the defective blocks with mutually different attributes in the order of their physical addresses.

6. A method for performing formatting processing on an information storage medium,
the storage medium including a plurality of blocks, to each of which a physical address is assigned and some of which have been detected as defective blocks,
the storage medium also including a defect management area to store a defect list in which the defective blocks are classified according to types of their attributes, the method including:
performing the formatting processing including defective block processing in which the defect list is updated in accordance with a status of the defective blocks,
wherein the performing includes performing the defective block processing on two or more of the defective blocks with mutually different attributes in the order of their physical addresses.

* * * * *